(12) United States Patent
Little et al.

(10) Patent No.: US 8,227,127 B2
(45) Date of Patent: Jul. 24, 2012

(54) ELECTROCHEMICAL APPARATUS TO GENERATE HYDROGEN AND SEQUESTER CARBON DIOXIDE

(75) Inventors: C. Deane Little, Boulder, CO (US); Timothy C. Heffernan, Indianapolis, IN (US); Joseph V. Kosmoski, Wildomar, CA (US); C. Gordon Little, Boulder, CO (US)

(73) Assignee: New Sky Energy, Inc., Boulder, CO (US)

( * ) Notice: Subject to any disclaimer, the term of this patent is extended or adjusted under 35 U.S.C. 154(b) by 1139 days.

(21) Appl. No.: 12/062,322

(22) Filed: Apr. 3, 2008

(65) Prior Publication Data

US 2008/0248350 A1 Oct. 9, 2008

Related U.S. Application Data

(60) Provisional application No. 60/921,598, filed on Apr. 3, 2007.

(51) Int. Cl.
| | |
|---|---|
| H01M 8/04 | (2006.01) |
| C25D 17/00 | (2006.01) |
| C25B 9/00 | (2006.01) |
| C25B 1/02 | (2006.01) |
| C25C 1/00 | (2006.01) |
| C25C 1/02 | (2006.01) |
| C25C 7/00 | (2006.01) |
| H01M 6/30 | (2006.01) |
| B23H 11/00 | (2006.01) |

(52) U.S. Cl. ..... 429/443; 429/111; 204/242; 204/275.1; 204/278; 204/257; 204/258; 205/340; 205/628; 205/637

(58) Field of Classification Search ........................ None
See application file for complete search history.

(56) References Cited

U.S. PATENT DOCUMENTS 1,500,126 A 7/1924 Hanson et al.
(Continued)

FOREIGN PATENT DOCUMENTS

WO WO2005/005981 1/2005

OTHER PUBLICATIONS

Doe Hydrogen Program, FY 2004 Progress Report: "II.F.2 Renewable Electrolysis Integrated System Development and Testing," pp. 119-122.

(Continued)

*Primary Examiner* — In Suk Bullock
*Assistant Examiner* — Jennifer Wecker
(74) *Attorney, Agent, or Firm* — Marsh Fischmann & Breyfogle LLP

(57) ABSTRACT

A carbon dioxide negative method of manufacturing renewable hydrogen and trapping carbon dioxide from the air or gas streams is described. Direct current renewable electricity is provided to a water electrolysis apparatus with sufficient voltage to generate hydrogen and hydroxide ions at the cathode, and protons and oxygen at the anode. These products are separated and sequestered and the base is used to trap carbon dioxide from the air or gas streams as bicarbonate or carbonate salts. These carbonate salts, hydrogen, and trapped carbon dioxide in turn can be combined in a variety of chemical and electrochemical processes to create valuable carbon-based materials made from atmospheric carbon dioxide. The net effect of all processes is the generation of renewable hydrogen from water and a reduction of carbon dioxide in the atmosphere or in gas destined to enter the atmosphere.

63 Claims, 9 Drawing Sheets

U.S. PATENT DOCUMENTS

| | | | | |
|---|---|---|---|---|
| 3,222,267 A | * | 12/1965 | Tirrell et al. | 205/496 |
| 3,322,574 A | * | 5/1967 | Winsel et al. | 429/409 |
| 3,944,474 A | | 3/1976 | Verlaeten | |
| 4,001,384 A | * | 1/1977 | Iwakura et al. | 423/551 |
| 4,197,421 A | | 4/1980 | Steinberg | |
| 4,215,182 A | | 7/1980 | Ang et al. | |
| 4,312,720 A | | 1/1982 | Lefevre | |
| 4,560,451 A | * | 12/1985 | Nielsen | 205/428 |
| 4,663,004 A | * | 5/1987 | Switzer | 205/103 |
| 4,680,095 A | | 7/1987 | Wheaton | |
| 4,802,960 A | | 2/1989 | Eisman et al. | |
| 5,425,863 A | | 6/1995 | Chiti | |
| 5,543,034 A | | 8/1996 | Hilbertz et al. | |
| 5,599,438 A | | 2/1997 | Shiramizu et al. | |
| 5,928,488 A | | 7/1999 | Newman | |
| 6,319,391 B1 | * | 11/2001 | Holderness et al. | 205/768 |
| 6,576,362 B2 | | 6/2003 | Hanlon | |
| 6,846,584 B2 | | 1/2005 | Dutil et al. | |
| 6,855,450 B2 | | 2/2005 | Molter et al. | |
| 6,887,601 B2 | | 5/2005 | Moulthrop, Jr. et al. | |
| 6,890,497 B2 | | 5/2005 | Rau et al. | |
| 7,020,562 B2 | | 3/2006 | Lillis et al. | |
| 7,153,409 B2 | | 12/2006 | Shiepe et al. | |
| 7,635,531 B1 | * | 12/2009 | Carreiro et al. | 429/418 |
| 2002/0025457 A1 | | 2/2002 | Dodd et al. | |
| 2002/0106540 A1 | | 8/2002 | Shioya | |
| 2002/0148574 A1 | * | 10/2002 | Van Draanen et al. | 162/14 |
| 2002/0197727 A1 | * | 12/2002 | Srinivasan et al. | 436/161 |
| 2004/0101740 A1 | * | 5/2004 | Sanders | 429/40 |
| 2004/0222542 A1 | * | 11/2004 | Jan et al. | 264/70 |
| 2005/0002847 A1 | | 1/2005 | Maroto-Valer et al. | |
| 2005/0011770 A1 | * | 1/2005 | Katsuyoshi et al. | 205/742 |
| 2005/0013750 A1 | | 1/2005 | Monzyk et al. | |
| 2005/0098443 A1 | * | 5/2005 | Gomez | 205/637 |
| 2005/0183962 A1 | * | 8/2005 | Oakes | 205/340 |
| 2005/0194041 A1 | | 9/2005 | Fan et al. | |
| 2006/0185985 A1 | * | 8/2006 | Jones | 205/508 |
| 2006/0235091 A1 | | 10/2006 | Olah et al. | |
| 2007/0045125 A1 | * | 3/2007 | Hartvigsen et al. | 205/637 |
| 2007/0187247 A1 | * | 8/2007 | Lackner et al. | 204/518 |
| 2007/0217981 A1 | * | 9/2007 | Van Essendelft | 423/220 |
| 2008/0248350 A1 | | 10/2008 | Little et al. | |

OTHER PUBLICATIONS

National Renewable Energy Laboratory, "Technology Brief: Analysis of Current-Day Commercial Electrolyzers," Sep. 2004, 2 pp.

"Serpentine locks up Carbon Dioxide," www.physorg.com, Sep. 2, 2004, 1 pg.

Friedland et al., "Hydrogen Production Through Electrolysis," Proceedings of the 2001 DOE Hydrogen Program Review, May 2001, 10 pp.

Harrison et al., (NREL) "Characterizing Electrolyzer Performance for Use in Wind Energy Applications," presented at the American Wind Energy Association's Windpower annual conference, Jun. 4-7, 2006, 28 pp.

Kroposki (NREL) et al., "Electrolysis: Information and Opportunities for Electric Power Utilities,"Technical Report, Sep. 2006, 33 pp.

Kroposki (NREL), "Renewable Electrolysis Integrated System Development and Testing," presented at the 2006 DOE Hydrogen, Fuel Cells & Infrastructure Technologies Program Review, May 16, 2006, 27 pp.

Ivy (NREL), "Summary of Electrolytic Hydrogen Production," Milestone Completion Report, Sep. 2004, 27 pp.

NREL, "Wind-to-Hydrogen Project," www.nrel.gov/hydrogen/proj_wind_hydrogen.html, content last updated on Jun. 1, 2007, 2 pp.

Levene et al. (NREL), "Wind Energy and Production of Hydrogen and Electricity-Opportunities for Renewable Hydrogen," Conference Paper, presented at the 2006 POWER-GEN Renewable Energy and Fuels Technical Conference, Apr. 10-12, 2006, 18 pp.

Mandin et al., "Electrochemical process modelling: water electrolysis for hydrogen production," presented at the CHISA 2006: 17th International Congress of Chemical and Process Engineering conference in Praha, Czech Republic, Aug. 27-31, 2006, 7 pp.

International Search Report and Written Opinion from international application No. PCT/US08/59310, mailed Jul. 8, 2008, 13 pp.

International Search Report and Written Opinion of international application No. PCT/US08/65387, mailed Aug. 22, 2008, 12 pp.

* cited by examiner

ELECTROCHEMICAL APPARATUS TO GENERATE HYDROGEN AND SEQUESTER CARBON DIOXIDE

BENEFIT CLAIM

This application claims the benefit under 35 U.S.C. 119(e) of U.S. Provisional Patent Application No. 60/921,598, filed on Apr. 3, 2007, entitled "A Novel Electrochemical Method for Removing Carbon Dioxide from Gas Streams and Simultaneously Generating Hydrogen Gas," which is herein incorporated by reference in its entirety.

CROSS-REFERENCE TO RELATED APPLICATIONS

This application is related to co-owned and co-pending application entitled RENEWABLE ENERGY SYSTEM FOR HYDROGEN PRODUCTION AND CARBON DIOXIDE CAPTURE, filed on the same day and assigned Ser. No. 12/062,374 and to co-owned and co-pending application entitled ELECTROCHEMICAL METHODS TO GENERATE HYDROGEN AND SEQUESTER CARBON DIOXIDE, filed on the same day and assigned Ser. No. 12/062,269, both of which are herein incorporated by reference in their entirety.

TECHNICAL FIELD

The present invention relates to an electrochemical apparatus for the production of hydrogen, oxygen, acid and base. The apparatus is used for carbon dioxide capture and sequestration and to produce hydrogen. More specifically, the present invention relates to electrochemical apparatus to generate products from water electrolysis that are used to capture and sequester carbon dioxide from the atmosphere or a gaseous source and to generate hydrogen as a renewable fuel source.

BACKGROUND

Removing carbon dioxide from the atmosphere or from a gaseous source requires a very large energy input to overcome the entropic energies associated with isolating and concentrating diffuse gases. Current equipment and strategies for sequestering carbon dioxide from the atmosphere or for producing renewable hydrogen are either inefficient, cost prohibitive, or produce toxic by-products such as chlorine. To lower global carbon dioxide levels and reduce new carbon dioxide emissions, it is critical to develop economically viable equipment and processes to remove vast quantities of carbon dioxide from the atmosphere or gas streams by capturing and sequestering it in a stable form or by converting it to valuable commodity products. The production of carbon-free renewable fuels such as renewable hydrogen is also an important goal in addressing global warming.

SUMMARY

The present invention encompasses an electrochemical apparatus to sequester carbon dioxide from gas streams and generate hydrogen for use as a fuel source. In one embodiment, the electrochemical apparatus comprises the following components:

a) a water electrolysis chamber, adapted to electrolyze water and to be electrically connected to an electrical energy source, comprising at least one cathode, at least one anode and an aqueous electrolyte solution, the chamber includes a first region adapted to concentrate hydroxide ions produced at the cathode and a second region adapted to concentrate hydronium ions produced at the anode when direct current is applied to the chamber during use;

b) a gas contact assembly operably connected to the first region of the chamber and adapted to receive hydroxide ions in solution from the chamber and to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution; and d) a separation chamber operably connected to the gas contact assembly and adapted to separate the bicarbonate or carbonate ions from the solution in the gas contact assembly.

In another embodiment the electrochemical apparatus includes the following components:

a) a water electrolysis chamber, adapted to electrolyze water and to be electrically connected to a renewable energy source, comprising at least one cathode, at least one anode and an aqueous electrolyte solution, the chamber comprising a first region adapted to concentrate hydroxide ions produced at the cathode and a second region adapted to concentrate hydronium ions produced at the anode when direct current at a predetermined voltage to electrolyze water is applied to the chamber during use;

b) a gas contact assembly operably connected to the first region of the chamber and adapted to receive hydroxide ions in solution from the chamber and to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution;

d) a separation chamber operably connected to the gas contact assembly and adapted to separate the bicarbonate or carbonate ions from the solution in the gas contact assembly;

e) hydrogen collecting equipment to collect renewable hydrogen produced at the cathode during use;

f) optional oxygen collecting equipment to collect oxygen produced at the anode during use; and g) a fuel cell, electrically connected to the chamber and operably connected to the hydrogen collecting equipment and the optional oxygen collecting equipment, adapted to generate direct current from the hydrogen produced at the cathode.

In another embodiment, the electrochemical apparatus comprises the following components:

a) a water electrolysis chamber, adapted to electrolyze water and to be electrically connected to a electrical energy source, comprising at least one cathode, at least one anode and an aqueous electrolyte, the chamber comprising a first region adapted to concentrate hydroxide ions produced at the cathode and a second region adapted to concentrate hydronium ions produced at the anode when direct current is applied to the chamber during use;

b) a gas contact assembly integral with the first region of the chamber and adapted to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution; and d) a separation chamber operably connected to the gas contact assembly and adapted to separate the bicarbonate or carbonate ions from the solution in the gas contact assembly.

In still another embodiment, the electrochemical apparatus comprises:

a) a water electrolysis chamber, adapted to electrolyze water and to be electrically connected to a electrical energy source, comprising at least one cathode, at least one anode and an aqueous electrolyte, the chamber comprising a first region adapted to concentrate hydroxide ions produced at the cathode and a second region adapted to concentrate hydronium ions produced at the anode when direct current is applied to the chamber during use;

b) base supply equipment operably connected to the first region of the chamber and adapted to receive aqueous hydroxide base from the chamber and provide the hydroxide base as a droplets; and c) gas contact assembly to contact the atmosphere or the gas stream containing carbon dioxide with the hydroxide base and react the carbon dioxide with the hydroxide base droplets to form a solution of bicarbonate or carbonate ions.

In each of the embodiments set out above, the electrochemical apparatus may include additional components. In one embodiment the apparatus includes hydrogen collecting equipment to collect hydrogen produced at the cathode during use and optional oxygen collecting equipment to collect oxygen produced at the anode during use. These hydrogen and oxygen products are useful for use with fuels as a chemical or as chemical feedstock for onsite electrolysis and sequestration process or for other purposes in other fields. In another embodiment the apparatus includes a fuel cell, electrically connected to the chamber and operably connected to the hydrogen collecting equipment and optional oxygen collecting equipment, adapted to generate direct current electricity from the hydrogen produced at the cathode and the optional oxygen produced at the anode. In another embodiment the apparatus includes a precipitation chamber operably connected to the separation chamber and adapted to remove solid carbonate or bicarbonate salts from a liquid phase during use. In still another embodiment the apparatus includes carbon dioxide collecting equipment to collect pressurized carbon dioxide gas produced in the separation chamber. In still another embodiment the apparatus includes electrolyte supply equipment adapted to supply fresh electrolyte to the chamber in a variety of delivery configurations.

These and other aspects, processes and features of the invention will become more fully apparent when the following detailed description is read with the accompanying figures and examples. However, both the foregoing summary of the invention and the following detailed description of it represent one potential embodiment, and are not restrictive of the invention or other alternate embodiments of the invention.

Figure 1:
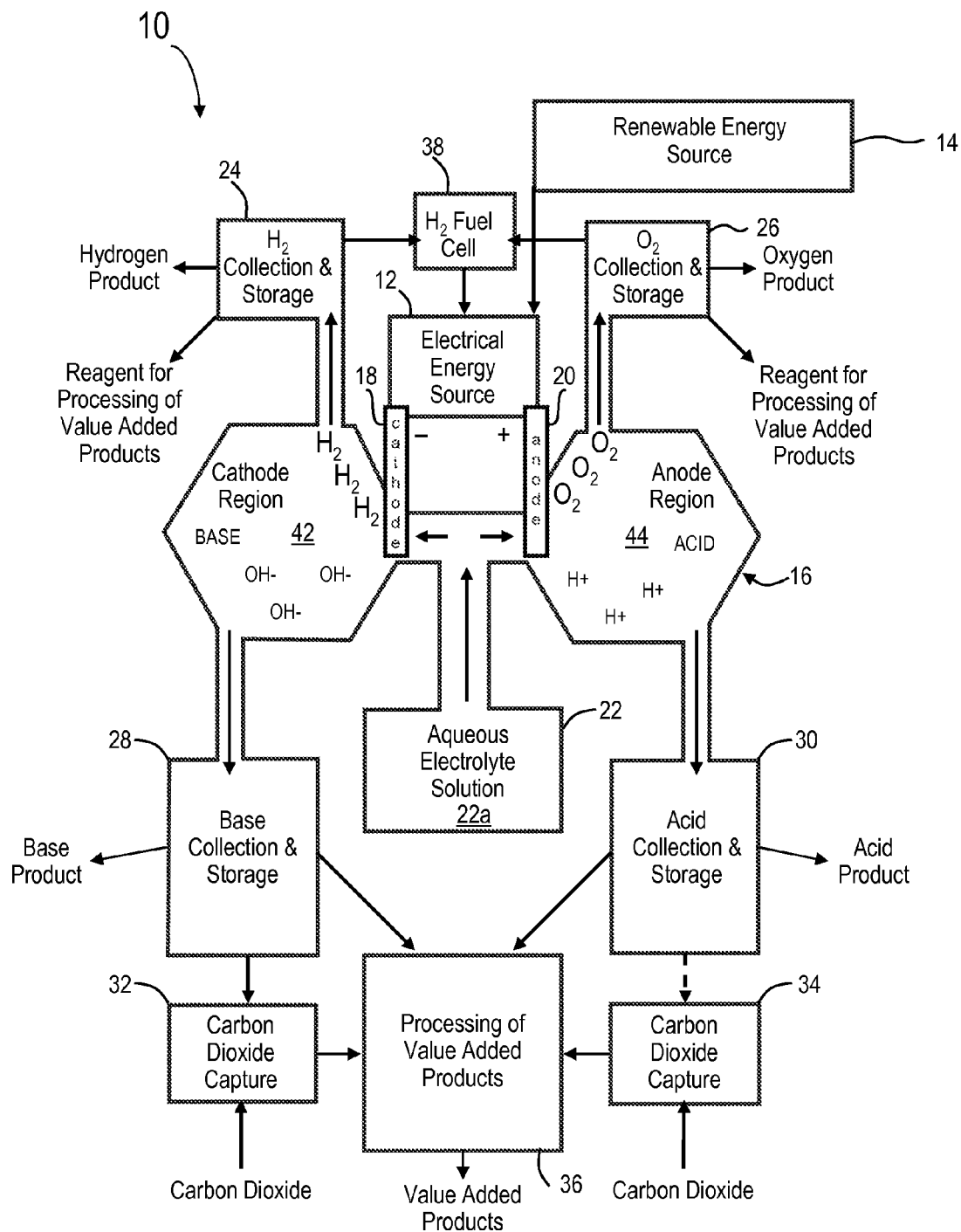
FIG. 1 is a schematic diagram of a water electrolysis apparatus according to various embodiments of the present invention.

While the invention is amenable to various modifications and alternative forms, some embodiments have been illustrated by way of example in the drawings and are described in detail below. The intention, however, is not to limit the invention by those examples and the invention is intended to cover all modifications, equivalents, and alternatives to the embodiments described in this specification.

DETAILED DESCRIPTION

The present invention encompasses an electrochemical apparatus to generate hydrogen and sequester carbon dioxide from the atmosphere or a gas stream. The apparatus includes a water electrolysis device adapted to electrolyze water and produce hydrogen, oxygen, acid and hydroxide base, a gas contact assembly and gas supply equipment to contact air or gas streams containing carbon dioxide with hydroxide base from the electrolysis unit, and a separation chamber to concentrate, process or isolate the bicarbonate and carbonate salts formed from the reaction of base with carbon dioxide.

The water electrolysis device consists of a corrosion resistant chamber containing an aqueous electrolyte solution and one or more anodes aligned with one or more cathodes in a configuration that minimizes electrical resistance between the electrodes. When supplied with a direct current voltage of sufficient strength to electrolyze water, the water electrolysis device produces and captures oxygen and concentrated acid at the anode region and hydrogen and hydroxide base at the cathode region. Suitable electrolyte salts include, but are not limited to, sodium sulfate, potassium sulfate, calcium sulfate, magnesium sulfate, sodium nitrate or potassium nitrate. Suitable electrode materials include, but are not limited to, nickel, platinum, carbon, stainless steel, or any conductive material resistant to chemical corrosion in the electrolyte under the pH conditions and voltages used to electrolyze water. Other suitable electrolyte solutions include sea water and aqueous sea salt solutions. Wire, sheet, screen, microsphere, nanosphere or porous electrodes are suitable alternatives to maximize electrode surface area. Stacked electrodes, charged with the same or different voltages, may be used to maximize hydrogen, oxygen, acid, and base production.

Either continuous or batch-wise liquid flow is used in the water electrolysis device. A variety of flow patterns are used to allow electrolyte solutions to flow parallel to, around, or through electrodes. Flow controllers, permeable barriers and counter-current flow designs control or direct electrolyte flow to maximize efficiency and minimize any loss of acid and base that could occur by recombination of produced ions. Ion selective membranes or active electrical barriers also selectively direct flow of salt anions toward the anode and salt cations toward the cathode. A central feed reservoir to supply fresh electrolyte solutions between the anode and cathode regions serves to provide physical separation of the acid and base and minimize undesired recombination. Non-selective ion permeable membranes, filters or gels used between the electrodes may also serve to minimize fluid mixing while maintaining high electrical conductivity in the electrolyte solution between the electrodes.

Figure 2:
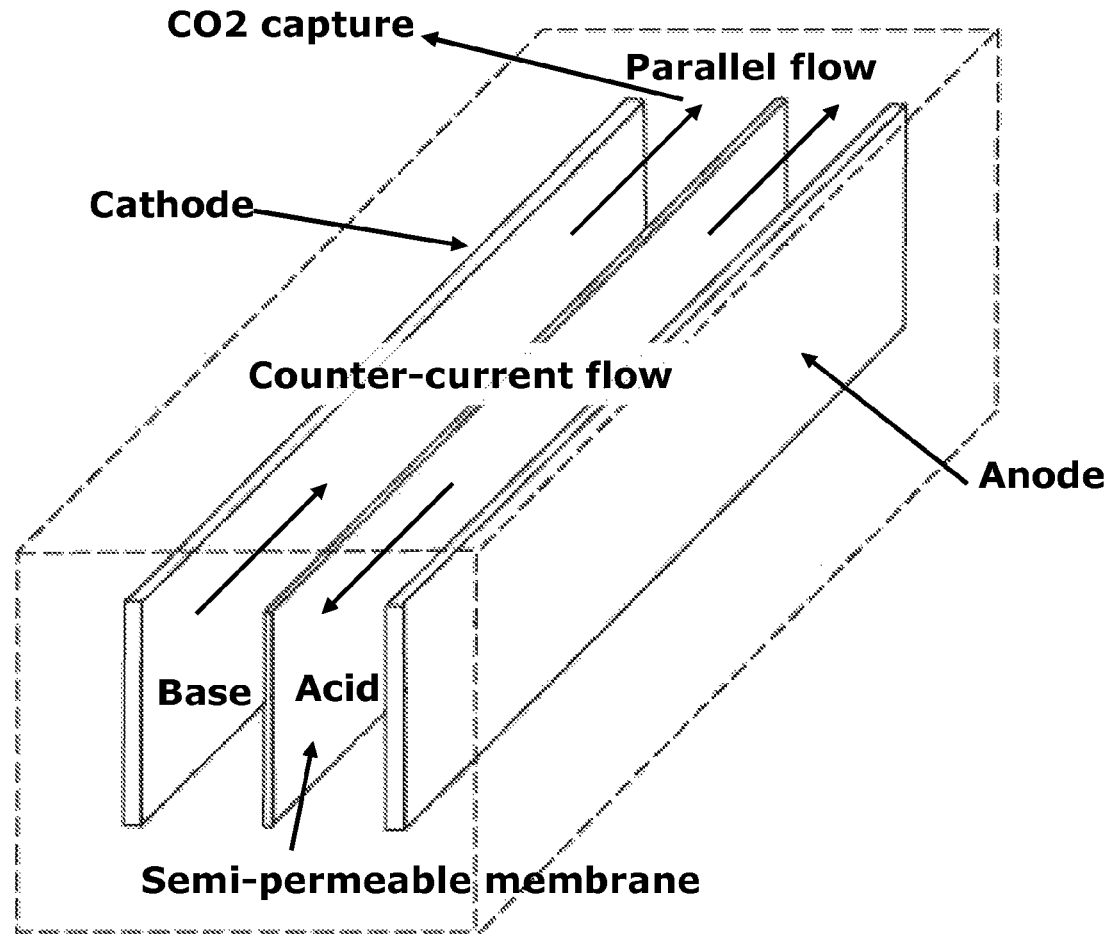
FIG. 2 is a schematic diagram of a water electrolysis cell with one semi-permeable membrane.

FIG. 2 shows a schematic diagram of a water electrolysis cell with a single permeable membrane. The water electrolysis cell includes parallel cathode and anode chambers that contain closely spaced electrodes separated by a semi-permeable membrane. This configuration maintains high electrical conductivity while minimizing loss of acid and base to recombination within the water electrolysis cell.

Fresh aqueous electrolyte solution flows in the same direction in both the cathode and anode chambers, gradually becoming more basic in the cathode chamber and more acidic in the anode chamber. Alternatively, fresh aqueous electrolyte solution may be introduced through one of the cathode chamber and anode chamber. In this case, selective ion flow across an anion or cation specific membrane would ensure production of a highly pure acid or base, respectively. This water electrolysis cell can be operated in parallel or counter-current flow modes. Counter-current flow minimizes chemical gradients formed across the semi-permeable membrane and may reduce the energy required to create such gradients and produce highly concentrated acid and base. In a counter-current system, the highest concentrations of hydronium and hydroxide ions and their counter-ions are never located directly across the semi-permeable membrane from one another, but instead reach maximum strength opposite incoming fresh aqueous electrolyte solution in the counter-cell. This design avoids the need to create a 13-14-unit pH gradients across the semi-permeable membrane, instead producing no higher than a 7-unit pH gradient between either strong acid and neutral electrolyte, or strong base and neutral electrolyte.

Figure 3:
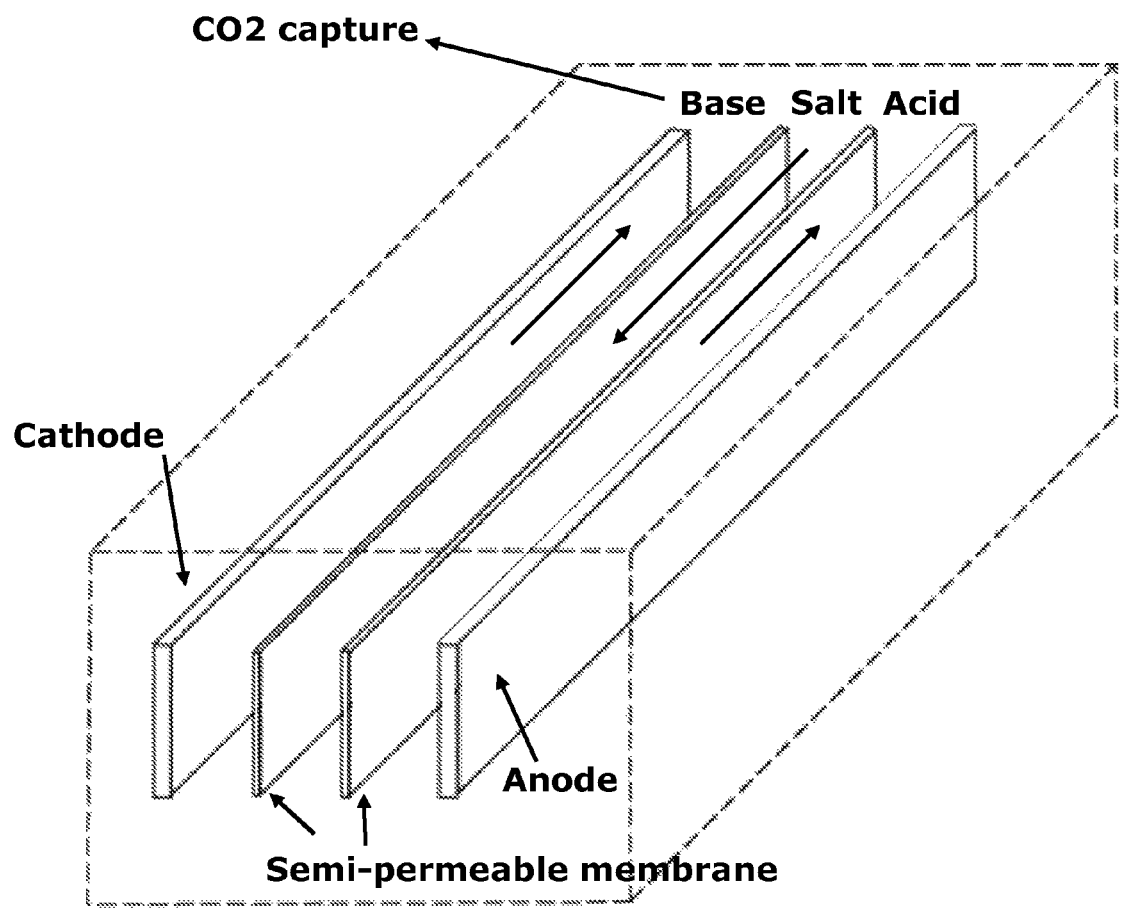
FIG. 3 is a schematic diagram of a water electrolysis cell with two semi-permeable membranes.

FIG. 3 shows a schematic diagram of a water electrolysis cell with two semi-permeable membranes. The water electrolysis cell is a parallel or counter-current flow three-chamber water electrolysis cell. A narrow central feed reservoir (such as electrolyte source) of fresh aqueous electrolyte solution is introduced in an illustrated counter current mode between a first semi-permeable membrane and a second semi-permeable membrane that separate the cathode chamber and anode chamber. In counter-current flow mode, concentrated aqueous electrolyte solution enters the central feed reservoir at a first end of the water electrolysis cell and concentrated base and acid exit the cathode chamber and the anode chamber, respectively. At a second end of the water electrolytic cell, dilute base and acid enter the cathode chamber and the anode chamber, and water or dilute aqueous electrolyte solution exits the central feed reservoir. This counter current flow design reduces salt contamination of base and acid produced and minimizes the chemical gradients formed across the permeable membranes. In some embodiments, the design may also be used to desalinate salt water and produce renewable hydrogen and materials to capture gaseous carbon dioxide.

In practice, the cathode chamber in FIG. 3 is initially filled with dilute base, and the anode chamber is filled with dilute acid, maintaining electrical conductivity between the electrodes. Cations flow from the central feed reservoir through the first semi-permeable membrane closest to the cathode chamber, combining with hydroxide ions formed at the cathode chamber to generate concentrated hydroxide base. Anions flow from the electrolyte solution source through the second semi-permeable membrane to the anode chamber, combining with protons formed at the anode chamber to produce concentrated acid. The semi-permeable membranes may be ion-selective (anion- or cation-specific) membranes, or may be passive barriers minimizing fluid flow, allowing passage of anions or cations in either direction. Regardless of membrane selectivity, such a 3-cell system can operate with parallel flow in all cells, or with countercurrent flow between the central feed reservoir and the cathode chamber and anode chamber on either side. The counter-current flow system minimizes chemical gradients across the membranes, because high concentrations of base and acid exit the cathode chamber and anode chamber opposite highly concentrated fresh electrolyte entering the central feed reservoir. The alternative parallel flow mode also provides related design advantages.

Figure 4:
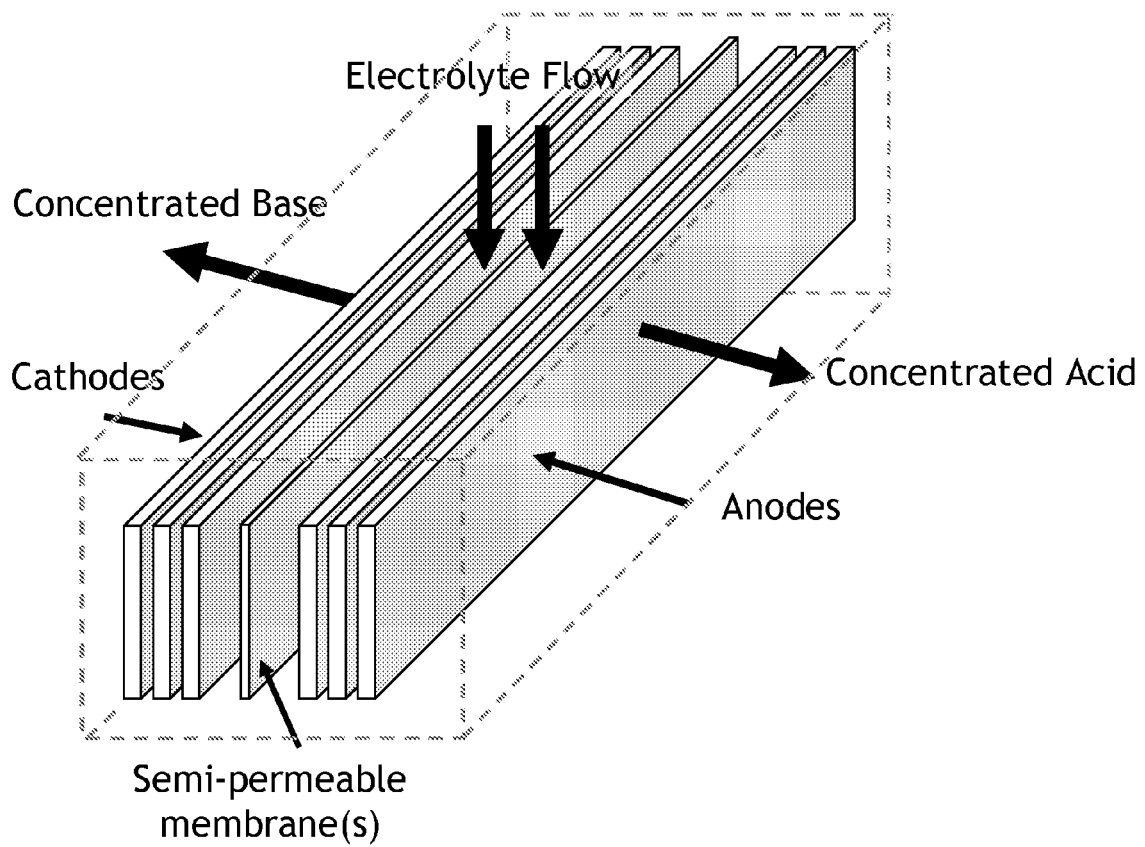
FIG. 4 is a schematic diagram of stacked water electrolysis cells according to various embodiments of the present invention.

FIG. 4 is a schematic diagram of a stacked water electrolysis cell according to some embodiments of the present invention. The stacked porous electrodes may be used in some embodiments to maximize acid and base production. According to one embodiment, as shown in FIG. 4, the water electrolysis cell includes two or more porous anode-cathode pairs aligned in a closely spaced parallel configuration. Semi-permeable or ion selective membranes are optionally included between the inner pair of electrodes. The membranes function to contain a narrow electrolyte feed reservoir located between the inner pair of porous anodes or cathodes. Fresh electrolyte flows from the reservoir outward, contacting the first pair of electrodes, where water oxidation occurs at the anode and water reduction occurs at the cathode. Thus, as water passes through each pair of electrodes it becomes increasingly acidic or basic. In one embodiment, the electrodes may consist of fine mesh screens, porous micro or nanosphere materials or thin plates with numerous flow channels penetrating the electrode. Varying DC voltages in the range of about 1.2 to about 10 Volts are supplied to these electrode pairs to maximize the production of acid in the anode chamber and base in the cathode chamber.

A central electrolyte supply chamber, separated by semi-permeable or ion selective membranes from the inner electrodes, supplies concentrated salt ions to the anode and cathode chambers. The anode and cathode chambers may initially be filled with fresh electrolyte, or with dilute acid and base, respectively. The latter mode of operation minimizes salt contamination of the final acid and base produced within the apparatus.

In one embodiment a central feed reservoir introduces fresh electrolyte solution between two ion selective membranes that direct cations and anions from the salt solution to the cathode and anode, respectively.

Direct current electricity at a predetermined and sufficient voltage to electrolyze water is used to charge the anode and cathode and power the device. Electrical energy produced by a renewable energy source such as solar, wind, hydroelectric, geothermal, wave, ocean current or biofuel energy are suitable sources of electricity. When powered by renewable energy the present apparatus operates in an overall carbon dioxide negative fashion, removing net carbon dioxide from the air or gas streams and converting it to a variety of value added products. Nuclear energy is an alternate source of electricity, and also allows carbon dioxide negative operation. Electricity from fossil fuel burning is another alternative, but does not currently allow carbon dioxide negative operation. With improvements in efficiency of the apparatus or the process of electricity generation, fossil fuel electricity would also allow a carbon dioxide negative operation of the apparatus. Direct current (DC) electricity converted from alternating current (AC) electricity is yet another electricity source to can be used to power the device. In some embodiments, the DC electricity is pulsed to minimize energy consumption and optimize production of acid, base, hydrogen and oxygen in the device by allowing gases to move away from the electrode surfaces between pulses. In one alternative embodiment the hydrogen and optionally the oxygen generated in the device are used to power a fuel cell to supplement the renewable energy source or provide renewable electricity for other purposes.

Ion selective membranes placed between the electrolyzing anode and cathode are used in some embodiments to direct salt ion flow toward the appropriate electrodes. These barriers selectively repel similarly charged ions and attract oppositely charged ions, and, in certain configurations, direct flow of anions toward the anode and cations toward the cathode. These barriers function to improve the purity and strength of the acid and base formed in the device. Non-selective ion permeable membranes, gels or screens will also reduce fluid mixing.

In one embodiment, a porous layer between anode and cathode regions contains one or more ion exchange resins that serve, to optimize the flow of salt ions to the electrodes and maximize the purity of acid and base produced within the apparatus.

A layer of negatively charged cation exchange resins adjacent to the cathode, and positively charged anion exchange resins adjacent to the anode, will serve to direct, concentrate or sort cations toward the cathode and anions toward the anode.

Hydroxide base produced in the cathode region is transported to a gas-liquid contact device. Suitable gas-liquid contact devices include a batch reactor, bubbler, a gas-liquid absorption-reaction device, or any series or combination of these devices. Passive carbon dioxide trapping modes include exposing a thin layer of hydroxide crystals or solution to the air or carbon dioxide contaminated gas streams. In one embodiment, a porous screen or fabric or series of such screens or fabrics is wetted with hydroxide base and exposed to passing air flow. In another embodiment, a wet scrubber consisting of gas permeable beds or layers saturated with base scrubs carbon dioxide from gas streams passing through the beds or layers. In another embodiment, a fine mist of base is sprayed into the air or a gas stream and particulate or droplet carbonate salt is collected by gravity or filtration. Virtually any method of efficiently mixing gas and liquid provides suitable alternative carbon dioxide trapping strategies.

A separation chamber produces highly concentrated carbonate and bicarbonate salts or solutions. Solutions enriched with carbonate or bicarbonate salts may be cooled to precipitate these salts. Either passive or active evaporation of water from carbonate salt solutions may be used independently or in conjunction with such precipitation processes. Solar, wind, heating, and depressurization are other alternatives. In another embodiment, addition of calcium or magnesium ions to a concentrated or enriched carbonate or bicarbonate solution will precipitate calcium or magnesium carbonate salts from more soluble sodium carbonate solutions. In still another embodiment, a water-soluble organic solvent such as methanol, ethanol or acetone will also precipitate carbonate salts from a concentrated carbonate or bicarbonate solution. Other chemicals that react with or bind carbonate or bicarbonate salts will also concentrate or remove these salts from solution.

The acid produced at the anode region of the device may optionally be used to release concentrated carbon dioxide from carbonate or bicarbonate salts for storage or further use. Carbon dioxide collecting or transporting equipment contains the released carbon dioxide at atmospheric pressure or higher. The expansion of hydrogen and oxygen gases from the water electrolysis process may also be optionally used to further compress the carbon dioxide to high or potentially supercritical pressures.

Electrolyte processing equipment supplies fresh electrolyte solution via continuous flow or batch-wise modes to the anode and cathode chambers. In one embodiment, the electrolyte solution is provided by a central feed reservoir separated by semi-permeable or ion-selective membranes from the anode and cathode regions. These ion selective membranes direct anions toward the anode and cations toward the cathode, minimizing salt contamination of the acid and base and simultaneously reducing loss of acid and base due to recombination. A passive semi-permeable membrane also minimizes such contamination or losses.

FIG. 1 is a schematic diagram of an integrated water electrolysis apparatus 10 according to various embodiments of the present invention. As illustrated in FIG. 1, the integrated electrolysis apparatus 10 includes an electrical energy source 12, an electrolysis cell 16 including a cathode 18 located in a cathode region 42 and an anode 20 located within an anode region 44, an aqueous electrolyte source 22, a hydrogen collection and storage reservoir 24, an oxygen collection and storage reservoir 26, a base collection and storage reservoir 28, and an acid collection and storage reservoir 30. Additionally, according to various embodiments, the integrated electrolysis apparatus includes a first carbon dioxide capture apparatus 32 connected to the base collection and storage reservoir 28, a second carbon dioxide capture apparatus 34 connected to the acid collection and storage reservoir 30, and a hydrogen/oxygen fuel cell 38.

The water electrolysis apparatus 10 is used to produce hydrogen, oxygen, acid, and base through water electrolysis, followed by subsequent processing of one or more of these products to capture and sequester carbon dioxide. Base produced by the integrated electrolysis apparatus 10 is used to capture and sequester carbon dioxide. Additionally, the integrated apparatus 10 produces renewable hydrogen as a carbon negative rather than a carbon neutral fuel. The renewable hydrogen produced by the apparatus 10 can be used as a large-scale fuel or commodity for reducing global carbon dioxide pollution, a significant factor in global warming. When combined with renewable or non-carbon dioxide producing energy sources, the integrated water electrolysis apparatus 10 creates carbon dioxide negative energy strategies for reducing the amount of carbon dioxide in the atmosphere and for producing clean, renewable hydrogen fuel. In addition, unlike traditional methods of manufacturing hydroxide base, such as the chloralkali electrolysis method, no substantial carbon dioxide or chlorine gas is produced.

As illustrated in FIG. 1, the integrated water electrolysis apparatus includes at least one electrolysis cell 16. Electrolysis cells are well known to those of skill in the art. According to various embodiments, an electrolysis cell includes a cathode 18 located within a cathode region 42, an anode 20 located within anode region 44, and an aqueous electrolyte 22A. Water is reduced at the cathode and oxidized at the anode. The electrolyte is responsible for charge transfer and provides counter-ions to hydroxide and protons produced within the electrolysis cell.

According to various embodiments of the present invention, the water electrolysis cell 16 includes a separate cathode region 42 and a separate anode region 44. In some embodiments, an ion selective membrane may be used to maintain separate anode and cathode regions. In still other embodiments, a porous glass frit, filter of other non-selective barrier is used to maintain separate cathode and anode regions 42 and 44.

The cathode region 42 and the anode region 44 are electrically connected by an aqueous electrolyte solution 22A supplied from the electrolyte source 22. The aqueous electrolyte solution 22A may contain sodium, potassium, calcium, magnesium, nitrate, carbonate salts, bicarbonate or other salts. According to various embodiments, the aqueous electrolyte includes an alkali salt. The alkali salt is substantially free of chloride and is a salt of the groups 1(IA) or 2(IIA) of the periodic table. Electrolytes suitable for use with the present invention include, but are not limited to, the following: sodium sulfate, potassium sulfate, calcium sulfate, magnesium sulfate, sodium nitrate, potassium nitrate, sodium bicarbonate, sodium carbonate, potassium bicarbonate, or potassium carbonate.

According to one embodiment of the present invention, the aqueous electrolyte solution 22A is a saturated solution of sodium sulfate prepared by adding an excess of sodium sulfate to about 1000 liters of clean distilled water placed in a 1200 liter electrolyte processing and storage reservoir. The solution is maintained at about 30 degrees Celsius (° C.) while being mechanically mixed overnight. The resultant solution is filtered and then pumped into the electrolysis unit 16 using a pump or gravity feed. In one embodiment, the aqueous electrolyte solution 22A contains substantially no chloride such that the electrolysis cell 16 and/or integrated electrolysis apparatus 10, produce essentially no chlorine gas. In one embodiment, the water electrolysis reaction within the electrolysis cell 16 and/or integrated electrolysis apparatus 10 produces less than about 100 parts per million (mg/L electrolyte) of chlorine, particularly less than about 10 mg/L of chlorine, and more particularly less than about 1 mg/L of chlorine.

The concentration of the aqueous electrolyte solution 22A varies depending on the demands of the electrolysis cell and the overall apparatus 10. The electrolyte concentration may vary with changes in the temperature, pH, and/or the selected electrolyte salt. According to one embodiment, the concentration of the aqueous electrolyte solution 22A is approximately 1M. According to another embodiment a saturated aqueous electrolyte solution 22A is maintained within the electrolysis cell.

Figure 5:
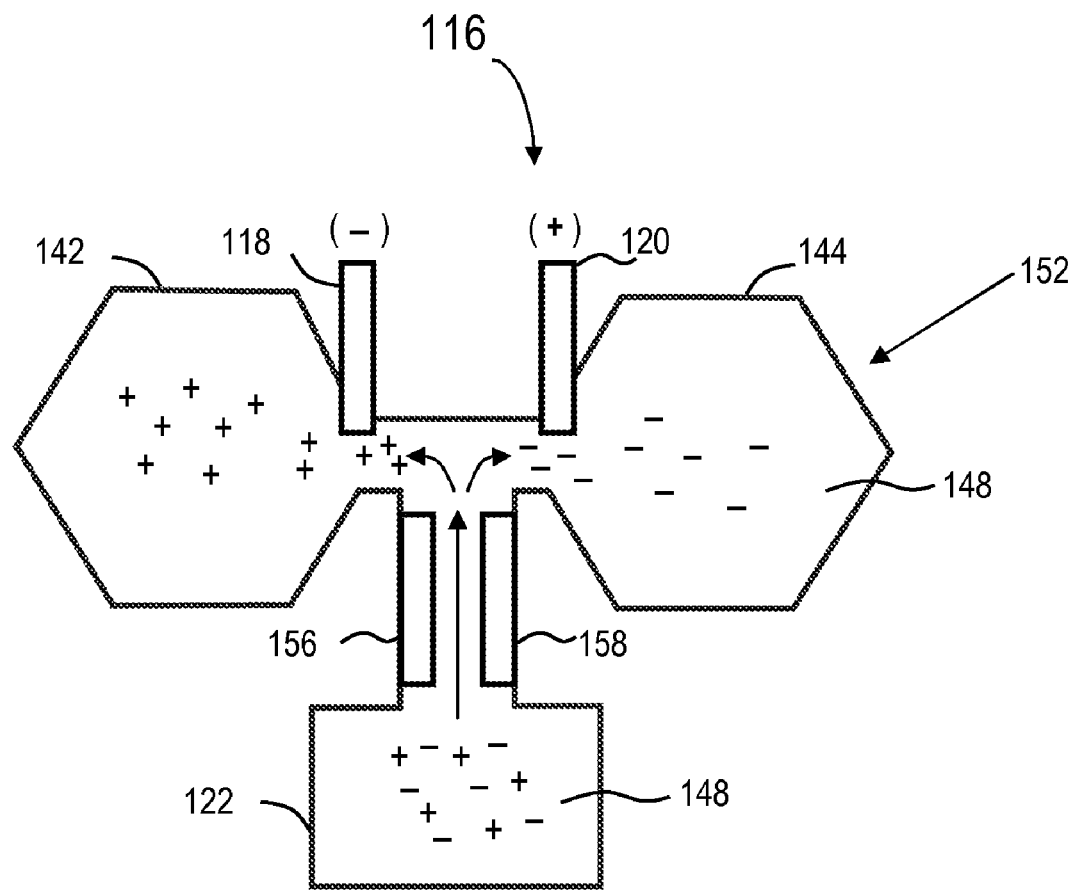
FIG. 5 is a schematic diagram of a water electrolysis cell according to other embodiments of the present invention.

According to some embodiments, the aqueous electrolyte solution 22A may undergo additional processing prior to entering the anode and cathode regions of the cell. FIG. 5 is a schematic diagram of electrolysis cell 116 used to process the aqueous electrolyte solution 148 prior to its introduction into the water electrolysis cell 116. As illustrated in FIG. 5, the electrolysis cell 116 includes an electrolysis chamber 152 including a cathode 118 located within a cathode region 142, 118 and an anode 120 located within an anode region 144. The electrolysis chamber 152 is fluidly coupled to an electrolyte source 122. According to various embodiments, the electrolysis cell 116, also includes a cathode electrolyte preparation electrode 156 and an anode electrolyte preparation electrode 158.

As illustrated in FIG. 5, the electrolyte preparation electrodes 156 and 158 are located within the aqueous electrolyte flow path from the electrolyte source 122 to the electrolysis chamber 152. According to various embodiments, a voltage is applied to the electrolyte preparation electrodes 156 and 158 that is less than the minimal theoretical voltage required for water electrolysis. According to some embodiments, the applied voltage is less than about 1.2 volts. When a potential is applied to the preparation electrodes 156 and 158, the preparation electrodes 156 and 158 act like charged poles, attracting the ions of the opposite charge. According to some embodiments, the electrolyte preparation cathodes 156 attract cations and repel anions. Similarly, the electrolyte preparation anodes 158 attract anions and repel cations. This process presorts the ions present in the electrolyte solution 148 prior to its introduction into the electrolysis chamber 152.

Referring again to FIG. 1, a direct current is supplied to the water electrolysis cell 16 from the electrical energy source 12 to electrolyze the aqueous electrolyte solution to produce hydrogen, oxygen, acid, and base. According to some embodiments, as illustrated in FIG. 1, a renewable energy source can be coupled to the electrical energy source to supply energy to the integrated apparatus. Exemplary renewable energy sources include, but are not limited to, the following: wind, solar, hydroelectric, oceanic, tidal, geothermal, and fuel cells using renewable hydrogen. These renewable energy sources do not generate carbon dioxide. Other energy sources that may generate carbon dioxide may also be used to provide energy to the electrical energy source including biofuel, biomass, coal, or methane. According to one embodiment, nuclear energy may also be used to provide energy to the integrated apparatus 10. According to yet further embodiments, a renewable energy source that generates substantially no carbon dioxide may be coupled with a conventional energy source to supplement and/or off-set the amount of energy supplied to the electrical energy source from the conventional energy source.

According to one embodiment, the direct current is supplied to the electrolysis cell 16 at a predetermined voltage sufficient to initiate water electrolysis within the electrolysis cell 16. According to one embodiment, the predetermined voltage supplied to the electrolysis cell is at least 1.2 volts. According to other embodiments, the predetermined voltage supplied to the cell ranges from about 1.2 volts to about 10 volts. The result of the electrolysis reaction within the cell 16 is the formation of protons and oxygen gas at the anode region, and hydroxide ions and hydrogen gas at the cathode region. The protons combine with anions present in the electrolyte solution to form acid. Similarly, the hydroxide ions combine with cations present in the electrolyte solution to form base.

The continuous production of acid and base during water electrolysis results in a pH difference between the cathode region 18 and the anode region 20 of the electrolysis cell 16. According to one embodiment, the difference in pH between the cathode region 18 and the anode region 20 is at least 4 pH units, at least 6 pH units, or at least 10 pH units or more. The difference in pH between the anode and the cathode regions can be maintained by preventing the anolyte formed in the anode region and the catholyte formed in the cathode region from combining.

Figure 6A:
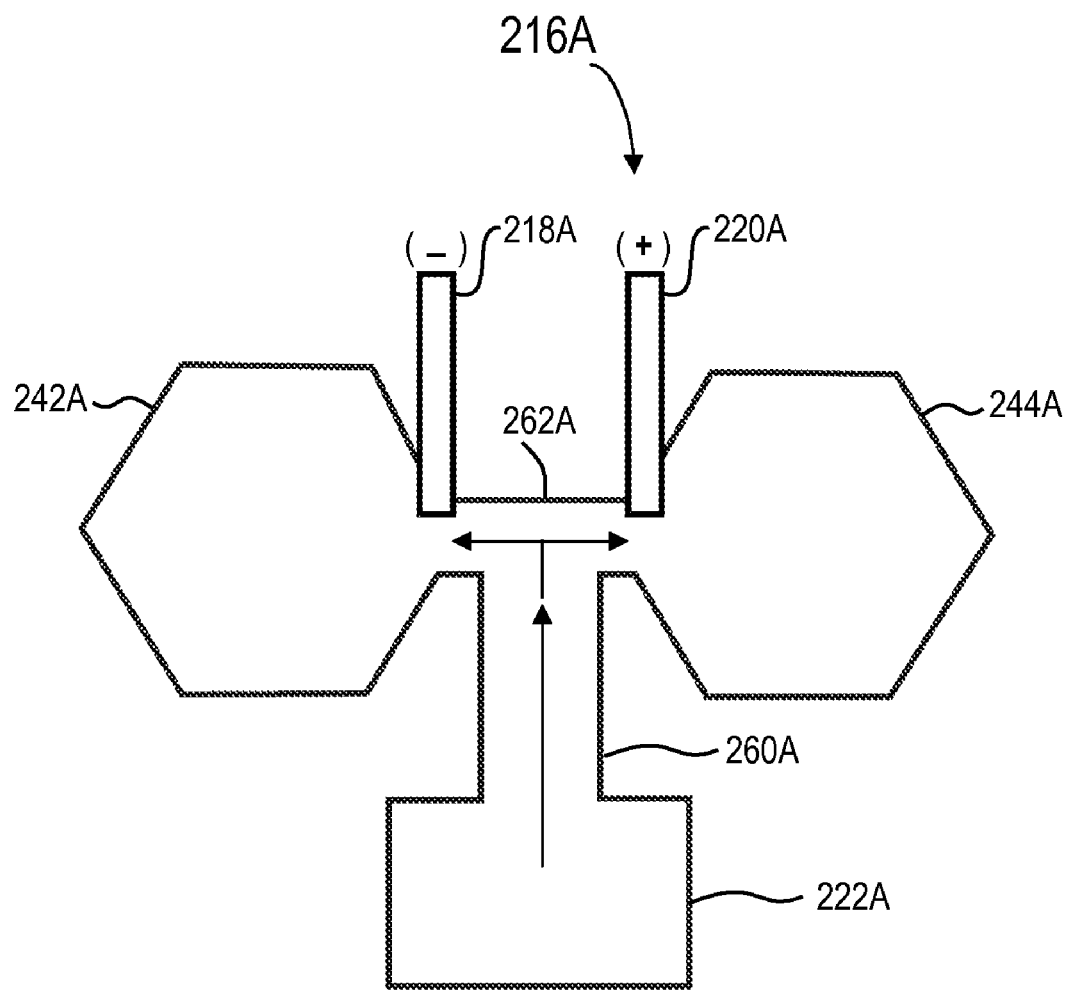
FIGS. 6A and 6B are schematic diagrams of a water electrolysis cell according to an embodiment of the present invention.
Figure 6B:
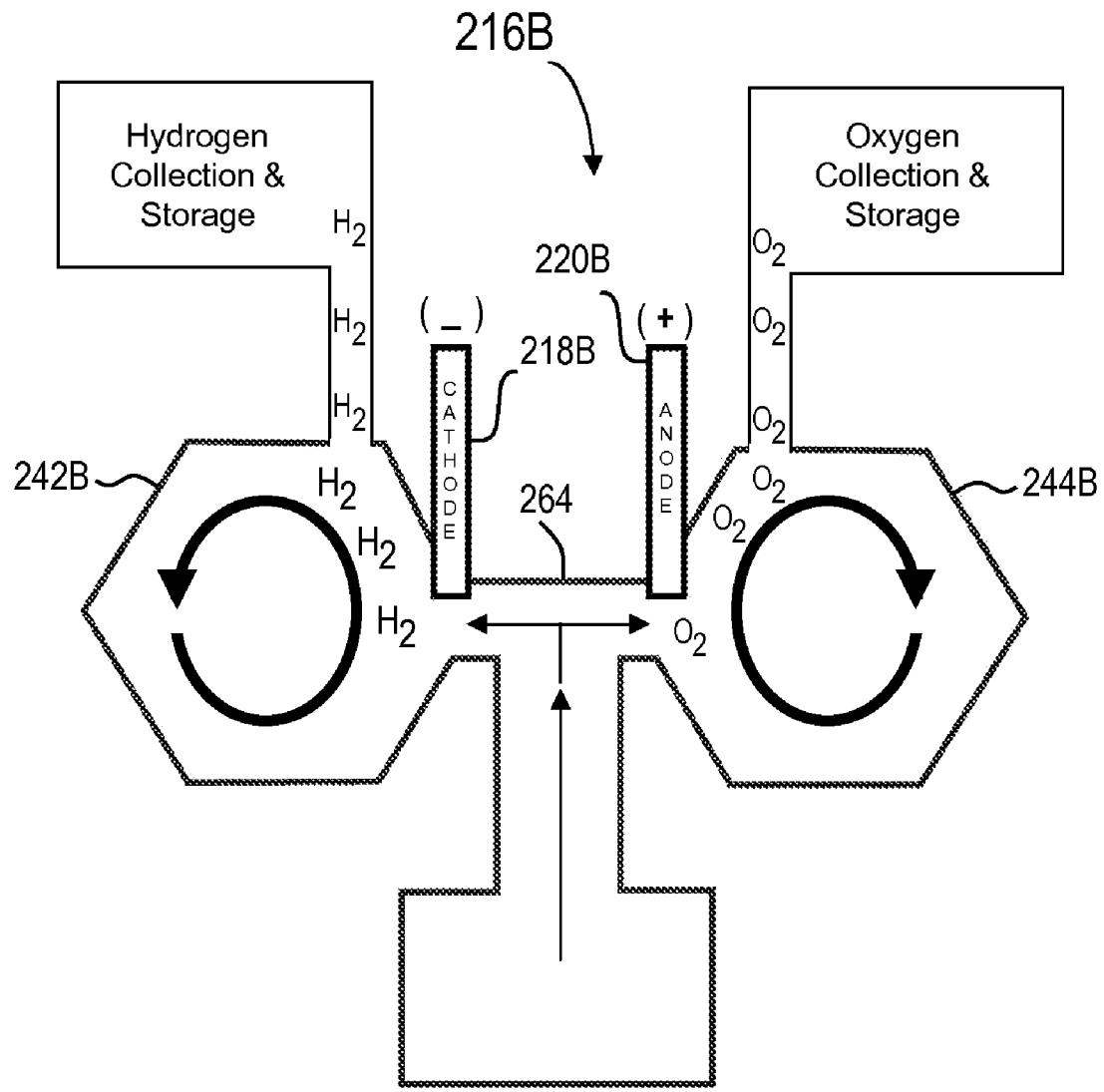

FIG. 6A is a schematic diagram of an electrolysis cell 216A according to one embodiment of the present invention. FIG. 6B is a schematic diagram of another electrolysis cell 216B according to another embodiment of the present invention. Each of the cells 216A and 216B as shown in FIGS. 6A and 6B are configured to maintain a separate cathode region 242A, 242B and a separate anode region 244A, 244B within the electrolysis cell 216A, 216B using fluid dynamics. Additionally, according to further embodiments, the cells 216A, 216B are configured to maintain a pH difference between the cathode region 242A, 242B and the cathode region 244A, 244B of at least 4 pH units and more particularly, of at least 6 pH units.

In one embodiment, as shown in FIG. 6A, the electrochemical cell 216A has a "T" configuration. The "T" shaped cell 216A includes an elongated vertical portion 260A branching bi-directionally into a horizontal portion 262. A continuous supply of fresh electrolyte flows through the elongated portion of the "T" shaped shell, indicated by the arrows, from the electrolyte source 222A. Once the electrolyte has reached the horizontal portion 260A of the "T" shaped cell 216A, the electrolyte then flows in opposite directions towards closely spaced cathode and anode regions 242A and 242B. According to various embodiments, the bi-directional flow rate of the electrolyte through the cell 216A is greater than the rate of ion migration due to the applied electric field and diffusion. Thus, the contents of the cathode and the anode regions 242A and 244A cannot recombine, and the pH difference between the anode and the cathode regions 242A and 244A can be maintained.

In another embodiment, as shown in FIG. 6B, convective currents within the cathode and anode regions 242B and 244B assist in maintaining a pH difference between the cathode region 242B and the anode region 244B of the electrolysis cell 216B. As shown in FIG. 6B, hydrogen gas is formed at the cathode 218B and rises in the form of bubbles in the electrolyte solution. The rising bubbles create convective currents in the cathode region 242B. Similarly, oxygen produced at the anode 220B rises in the form of bubbles, creating convective currents in the anode region 244B. Additionally, the electrolysis cell 216B includes a constricted pathway 264 fluidly coupling the cathode and anode regions 242B and 244B. The convective currents in the cathode and the anode regions 242B and 244B in combination with the constricted fluid pathway 264 between the cathode and anode regions 242B and 244B assist in maintaining a pH difference between the cathode and anode regions 242B and 244B of at least 4 pH units, at least 6 pH units or at least 10 pH units or more. In further embodiments, an electrolysis cell combining the features of the electrolysis cell shown in FIG. 6A and the features of the electrolysis cell shown in FIG. 6B can be utilized.

By preventing the products in the cathode region and the anode region from recombining within the electrolysis cell, the concentration of base and acid within the cathode region and anode region can be increased in a range of about 100 fold to 1,000,000 fold or more, or in a range of 100 fold to 10,000,000 fold or more, relative to their initial concentrations. The integrated water electrolysis apparatus 10 is thus capable of producing up to about 40 kilograms of sodium hydroxide or a molar equivalent amount of potassium hydroxide for every kilogram of hydrogen. In addition, according to some embodiments, the integrated electrolysis apparatus 10 is thus capable of producing up to about 49 kilograms of sulfuric acid for every kilogram of hydrogen. The anode and anode reaction region may generate between about 100 and about 10,000,000 times more hydronium ions than are initially present in the electrolyte solution and the cathode and cathode reaction region may generate between about 100 and about 10,000,000 times more hydroxide ions than are initially present in the electrolyte solution.

Once concentrations of base and acid reach a minimal increase of about one hundred fold or higher relative to their initial electrolyte concentration, the base and acid are removed from the cathode region and anode region of the electrolysis cell. In some embodiments, the base and acid are capable of increased concentration of 100,000 times or higher of their initial electrolyte concentrations. According to one embodiment, the base and the acid formed at the cathode and anode regions are pumped to their respective collection and storage reservoirs in the integrated apparatus 10. According to another embodiment, positive pressure may be applied to remove the base and acid from the cathode and anode regions. According to yet another embodiment, the base and acid may be removed from their respective cell regions via gravity feed. Fresh electrolyte is then delivered from the aqueous electrolyte source to equilibrate the volume of liquid in the cathode region and the anode region. According to one embodiment, the removal of acid and base and introduction of fresh electrolyte may be accomplished by a batch-wise process. According to another embodiment, the removal of base and acid and the introduction of fresh electrolyte may be accomplished by a continuous process, creating a continuous flow electrolysis system.

According to some embodiments, the electrolyte flow rate can be adjusted to overcome undesirable ion migration, eliminating acid and base recombination, or mixing of the electrolyte solution from the cathode and anode regions. According to other embodiments, the electrolyte flow rate can be adjusted to increase, decrease and/or maintain the concentrations of the base and acid produced in their respective regions of the electrolysis cell 16.

Referring back to FIG. 1, after water in the aqueous electrolyte solution has been electrolyzed to produce hydrogen, oxygen, base and acid, the products are sequestered and collected. The gases are routed from the cathode 18 and anode 20 to storage or flow systems designed to collect such gases. The low density of the gases relative to the aqueous electrolyte solution causes the gases to rise. The reaction regions are designed to direct this flow up and out of the cathode 18 and anode 20 and into adjacent integrated areas. The hydrogen, base, oxygen and acid are physically diverted for collection in the hydrogen collection and storage reservoir 24, the base collection and storage reservoir 28, the oxygen collection and storage reservoir 26 and the acid collection and storage reservoir 30, respectively.

The hydrogen and oxygen produced in the water electrolysis device are optionally collected in the hydrogen collection and storage reservoir 24 and the oxygen collection and storage reservoir 26, respectively. In some embodiments the hydrogen and oxygen are used to supplement the electrical energy source 12 when used as a fuel in a furnace, fuel cell 38, or engine to provide direct current electricity for electrolysis. The hydrogen and/or oxygen may also be used to react with other products of the integrated electrolysis apparatus 10 to create value-added products. The hydrogen and/or oxygen may be removed from the integrated electrolysis apparatus 10 as a product to be sold or used as a fuel or chemical feedstock internally or externally.

The acid produced by the electrolysis unit 16 is routed to the acid collection and storage reservoir 30. According to one embodiment the pH of the acid ranges from about pH 0 to about pH 5. The acid can be processed and removed from the apparatus for sale as a commodity. The acid may also be used to prepare certain mineral based carbon dioxide sequestering compounds, which are then used to capture carbon dioxide from the atmosphere or gas stream. The acid may also be used as a chemical reagent by the integrated apparatus to create other value added products. In one embodiment, the carbonate and bicarbonate salts are isolated after reacting the base with carbon dioxide. The acid can then release the carbon dioxide from the carbonate or bicarbonate salts in a controlled manner to further process the released carbon dioxide to produce value-added products. These products may include, but are not limited to, carbon monoxide, formic acid, urea, super-critical carbon dioxide, pressurized carbon dioxide, liquid carbon dioxide or solid carbon dioxide.

The base generated by the electrolysis unit 16 is sent to the base collection and storage reservoir 28 and is sold or used as a carbon dioxide neutral commodity or chemically reacted with carbon dioxide gas to form carbonate or bicarbonate. In one embodiment a pH of the base produced in the cathode region of the cell can range from about pH 8 to about pH 14. When used to capture carbon dioxide, the carbon dioxide is captured as carbonate, bicarbonate, or mixtures thereof. The carbon dioxide may be captured by reacting, sequestering, removing, transforming or chemically modifying gaseous carbon dioxide in the atmosphere or a gas stream. The gas stream may be flue gas, fermentation gas effluent, air, biogas, landfill methane, or any carbon dioxide-contaminated natural gas source. The carbonate salts may subsequently be processed to generate a variety of carbon-based products.

The reaction of the base with the carbon dioxide can be passive, relying only on natural gas-water mixing. An example of a passive reaction includes an open-air treatment pond filled with aqueous base or a lined bed of hydroxide crystals. The hydroxide-carbon dioxide reaction is spontaneous and can be enhanced by increased concentrations of base or carbon dioxide. The reaction can also proceed by active mechanisms involving the base or carbon dioxide. An example of an active reaction includes actively spraying, nebulizing, or dripping a basic solution into air or a gas stream containing carbon dioxide. In another example, carbon dioxide is actively removed by bubbling or forcing the gas stream through a column or reservoir of base generated by the electrolysis unit 16. Combinations of active and passive carbon dioxide trapping systems are also envisioned.

In some embodiments of the present invention, sodium bicarbonate and sodium carbonate are formed by the integrated water electrolysis apparatus 10. Sodium bicarbonate and sodium carbonate may be formed within the integrated electrolysis apparatus 10. Alternately, base may be removed from the integrated electrolysis apparatus 10 and transported to another site to capture carbon dioxide from the atmosphere or a gas stream using the passive or active techniques previously described. By using the base and/or acid to capture carbon dioxide from the atmosphere or a gas stream, the overall integrated electrolysis apparatus 10 sequesters substantially more carbon dioxide than it creates, resulting in a net negative carbon dioxide footprint.

Many carbon based products can be manufactured from carbon dioxide trapped by the integrated apparatus 10. Commercial products manufactured from carbon dioxide trapped by the integrated electrolysis apparatus 10 are carbon dioxide negative, resulting in an overall net decrease in atmospheric carbon dioxide as gaseous carbon dioxide is converted to value-added carbon products. Sale of these products may dramatically subsidize renewable hydrogen production, making clean hydrogen an inexpensive by-product of an industrial process focused on converting atmospheric carbon dioxide into valuable carbon-based products.

Figure 7:
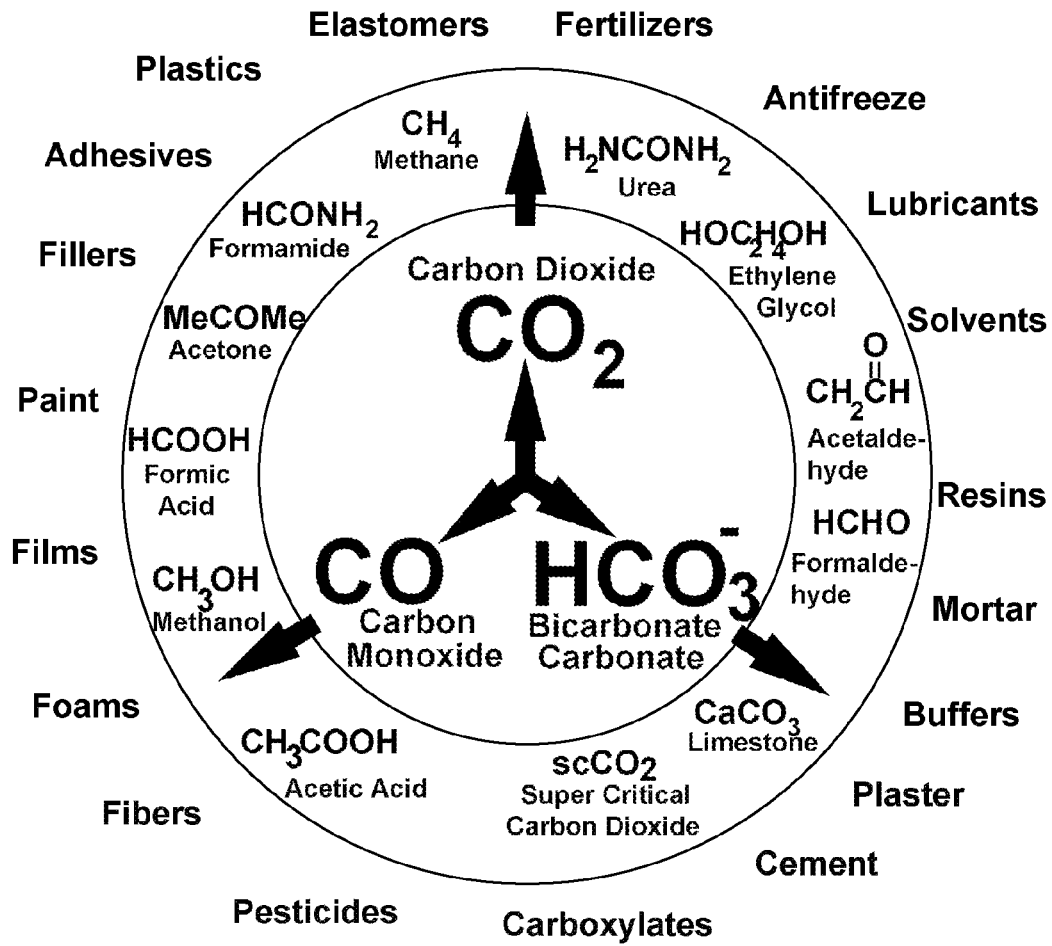
FIG. 7 is a schematic diagram of value-added products that may be processed from the water electrolysis apparatus of FIG. 1.

FIG. 7 illustrates value-added products that may be processed from the carbon dioxide captured using the base and/or acid produced by the integrated electrolysis apparatus 10. The integrated electrolysis apparatus 10 processes the value-added products from the center of the diagram outward. As previously described, base generated from electrolysis is reacted with carbon dioxide to produce carbonate and bicarbonate salts. The carbonate and bicarbonate salts can in turn be converted to carbon monoxide by chemical or electrochemical reduction or reaction of carbon dioxide with hydrogen. The combination of carbon monoxide and hydrogen is Syngas, a critical cornerstone of synthetic organic chemistry. Through additional processing of these central products, a number of chemical building blocks, such as methane, urea, ethylene glycol, acetaldehyde, formaldehyde, limestone, acetic acid, methanol, formic acid, acetone and formamide can be formed. These value added chemical building blocks can be sold as commodity chemicals or used to produce a second class of value-added products, including polymers, fabrics, urea and various building materials. These value-added end products are then removed from the integrated electrolysis apparatus 10 and sold, resulting in profitable conversion of carbon dioxide into carbon dioxide negative products. Simultaneous production of renewable hydrogen is subsidized by sale of these carbon products, reducing the cost of renewable hydrogen production and creating a carbon dioxide negative energy strategy with potentially dramatic impacts on global warming.

The center circle of FIG. 7 depicts products that can be produced from the reaction of hydroxide base with carbon dioxide, or (in the case of carbon monoxide) by chemical reduction of captured carbon dioxide. These chemical compounds include carbon dioxide, carbon monoxide, carbonate and bicarbonate, all of which can be easily inter-converted. They can be further processed to create a variety of carbon-based monomers that serve as building blocks for larger molecules. In many cases, the hydrogen, oxygen, acid and base generated by the electrolysis unit 16 can be used for this secondary processing. The carbon-based building blocks can also be further processed within the integrated electrolysis apparatus 10 to make many valuable carbon based products. Some examples of these are illustrated in the outer ring of FIG. 7.

Bicarbonate and/or carbonate can be isolated from the solution to produce a bicarbonate salt, a carbonate salt, or a mixture there of. This can be accomplished by a variety of techniques. For example, the pH of the solution can be maintained between 8 or 9 to favor bicarbonate formation or maintained higher than pH 11 to favor carbonate formation. Double displacement reactions may be used to isolate different forms of carbonate or bicarbonate. More specifically, sodium carbonate is reacted with calcium chloride to form calcium carbonate, which easily precipitates from solution. Similarly, magnesium salt can also be used to convert sodium salts of bicarbonate or carbonate to less soluble magnesium salts. The calcium carbonate and magnesium carbonate can be purified and used or sold. Other processing methods for the isolation of bicarbonate and carbonate include concentration, precipitation, heating, cooling, solar evaporating, vacuum evaporating, wind evaporating and crystallizing.

According to various embodiments, solid bicarbonate and/or carbonate can be used in the production of a wide range of building materials. For example bicarbonate and/or carbonate can be used as filler in the manufacture of plastics, elastomers, adhesives, and other polymer based materials. According to various other embodiments, the solid bicarbonate and/or carbonate can be used in the production of mortar, cement, plaster, tile, grout, wall board, or synthetic stone. Finally, solid sodium bicarbonate can be purified and sold as baking soda.

According to various embodiments of the present invention, base produced at the cathode region of the electrolysis cell can be utilized to produce carbon dioxide negative agricultural lime and quick lime. For example, a sodium sulfate solution is electrolyzed in a water electrolysis cell to form sodium hydroxide in the cathode region. The base is concentrated such that it reaches a pH of at least pH 10 and then is contacted with a gaseous source of carbon dioxide to favor production of a sodium carbonate enriched feedstock. The carbonate-enriched feedstock is then mixed with a calcium chloride solution. Solid calcium carbonate precipitates from the feedstock to produce agricultural lime. According to further embodiments, heat may be applied to the solid calcium carbonate, produced according to the method described above to produce carbon dioxide neutral quick lime, or, if the carbon dioxide released is captured again, carbon dioxide negative quick lime.

According to another embodiment of the present invention, acid generated in the anode region of the electrolysis cell can be utilized to produce a carbon dioxide sequestering material. Water in an aqueous electrolyte solution is electrolyzed in an electrolysis cell to produce strong acid at the anode region of the cell. At least some or all of the acid is removed from the anode region and collected and stored in an acid collection and storage reservoir. According to one embodiment, the acid is concentrated either within the anode region of the cell or in the acid collection and storage reservoir such that the resulting pH of the acid ranges from about pH 0 to about pH 5. According to a further embodiment, the acid is concentrated such that it has a pH of about pH 10. The acid is then reacted with a material that when exposed to a strong acid is converted to a carbon dioxide sequestering material. Exemplary materials that can be converted to a carbon dioxide sequestering material by reaction with a strong acid include, but are not limited to, the following: certain mineral clays, sepiolite, serpentine, talc, asbestos, and various mining byproducts such as asbestos mining waste. The common mineral serpentine can be dissolved in sulfuric acid producing a solution of magnesium sulfate while precipitating silicon dioxide as sand. Addition of sodium hydroxide creates a mixture of magnesium sulfate and magnesium hydroxide. The process also converts toxic asbestos and asbestos waste into non-toxic carbon dioxide binding materials. Subsequent exposure of the magnesium solution to carbon dioxide from the atmosphere or gas stream results in the formation of either magnesium carbonate or magnesite, which forms precipitates. These precipitates are well-suited for production of blocks used in construction. According to further embodiments of the present invention, the carbon dioxide sequestering material may be further reacted with strong acid to release carbon dioxide gas under controlled conditions. The carbon dioxide released from the carbon dioxide sequestering materials may be captured and stored for further processing.

According to various other embodiments, base produced in the cathode region and acid produced in the anode region of the electrolysis cell can be used to produce concentrated or pressurized carbon dioxide gas in a controlled reaction. For example, water in an aqueous electrolyte solution is electrolyzed to produce base at the cathode region and acid at the anode region. Some or all of the base is removed from the cathode region and collected and stored in the base collection and storage reservoir. Some of all of the acid is removed from the anode region and is collected and stored in the acid collection and storage reservoir. The hydroxide ions present in the base are reacted with a gaseous source of carbon dioxide to produce a solution including bicarbonate, carbonate, or mixtures thereof. The acid is reacted with the carbonate containing solution in a closed container to produce highly concentrated and pressurized carbon dioxide. Alternatively, the carbon dioxide gas can be released into a pipe or flow system for transport to a remote site. In other embodiments, the carbon dioxide may be further concentrated and/or purified.

According to other further embodiments, the carbon dioxide produced according to the method above can be converted to carbon dioxide neutral or carbon dioxide negative urea. Urea is a commonly used in the agricultural industry as a fertilizer as it is rich with nitrogen. According to various embodiments, the carbon dioxide is contacted with a source of anhydrous ammonia under pressure to produce urea. According to other embodiments, hydrogen produced at the cathode and carbon dioxide produced according to the various methods described above are reacted with nitrogen gas in an electrochemical process to produce urea.

In other embodiments, the carbon dioxide gas can be converted to useful products such as supercritical carbon dioxide. Pressurized carbon dioxide gas can be adjusted to a critical temperature and a critical pressure to produce supercritical carbon dioxide. Supercritical carbon dioxide is widely used in the food processing and fragrance industries to extract caffeine from coffee or tea, essential oils from seeds or plant materials, or to manufacture dry ice. Recent advances have also shown supercritical carbon dioxide to be a valuable reagent or solvent in synthetic organic chemistry.

In other embodiments of the present invention, the carbon dioxide produced according to the methods described above can be converted to carbon dioxide negative carbon monoxide, an essential building block in much of synthetic organic chemistry. Several well-known chemical pathways are used industrially to convert carbon dioxide to carbon monoxide. In one such embodiment, the Reverse Water Gas Shift reaction utilizes hydrogen produced at the cathode to reduce carbon dioxide into carbon monoxide and water.

Carbon monoxide has many applications in bulk chemicals manufacturing. For example, aldehydes are produced by the hydroformylation reaction of alkenes, carbon monoxide and hydrogen. Hydroformylation can be coupled to the Shell Higher Olefin Process to give precursors to detergents. Additionally, methanol can be produced by the hydrogenation of carbon monoxide. Finally in the Monsanto process, methanol and carbon monoxide react in the presence of a homogeneous rhodium catalyst and HI to give acetic acid. Any chemical pathway that converts carbon dioxide to carbon monoxide may be applied to carbon dioxide sequestered and released from products of the present water electrolysis and carbon dioxide capture technology described in this specification. When manufactured from atmospheric carbon dioxide, such products are carbon dioxide negative.

According to yet other embodiments of the present invention, formate and formic acid may be produced from the products of the water electrolysis reaction described herein. For example, base produced at the cathode can be reacted with a gaseous source of carbon dioxide to produce a solution containing bicarbonate, carbonate, or mixtures thereof. The carbonate containing solution can be reacted with acid from the anode to release carbon dioxide under controlled conditions. Hydrogen gas produced by the water electrolysis reaction and methanol are added stepwise to yield formic acid. In another embodiment, a 1M solution of Cesium bicarbonate, processed from carbon dioxide sequestered in a basic solution, is electrolyzed using palladium catalysts to produce formic acid in high yield and Faradaic efficiency. In yet another embodiment, selective catalytic hydrogenation of bicarbonate ions in a 1M aqueous solution can be achieved using palladium catalysts to yield formate. Any known chemical pathway that produces formic acid using products from the aforementioned electrolysis in a carbon dioxide negative method is contemplated by this embodiment.

According to various other embodiments of the present invention, the electrolysis products produced according to the methods described above can be used to produce methanol. Many metal oxides such as zinc and zirconium catalysts are known to reduce carbon dioxide to methanol. In one such embodiment, carbon dioxide trapped from the atmosphere or a gas stream using base generated by water electrolysis is released in a controlled environment using acid also produced from the electrolysis process. The carbon dioxide and hydrogen produced by water electrolysis are combined and reacted over a nickel catalyst to produce methanol. In another embodiment, the Fischer-Tropsch reaction is conducted over copper or palladium to preferentially yield methanol. Any chemical pathway that produces methanol using products from the present water electrolysis and carbon dioxide capture technology is a potential pathway.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were commercially obtained or may be synthesized by conventional techniques.

Example 1

Figure 8:
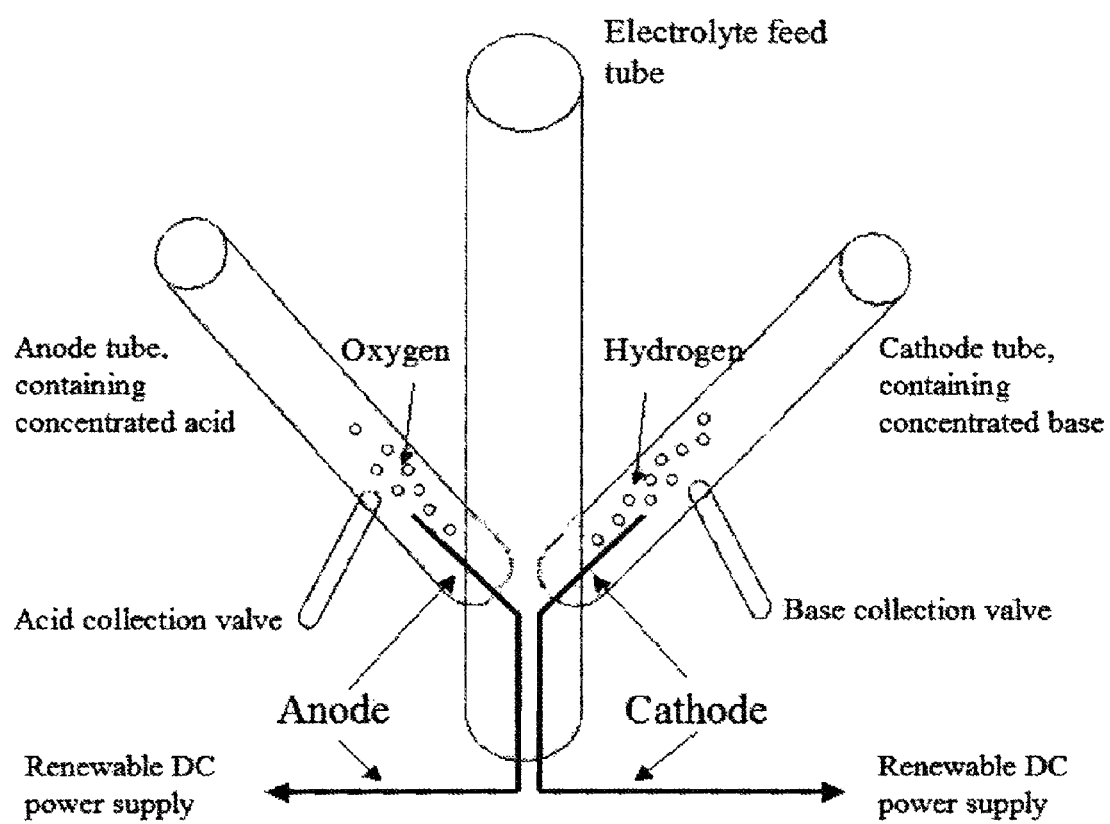
FIG. 8 is a schematic diagram of the water electrolysis cell used in Example 1.

A water electrolysis unit, illustrated in FIG. 8, was constructed to demonstrate the feasibility of generating concentrated acid and base for carbon dioxide trapping. It consisted of a vertical central electrolyte feed tube about 2.5 centimeters (cm) in diameter, connected near its base to upward slanting anode and cathode tubes attached opposite one another. Wire, screen or flat, linear electrodes consisting of nickel, stainless steel or platinum were placed in the anode and cathode tubes near their points of attachment to the central tube. A concentrated, chloride-free electrolyte solution of aqueous sodium sulfate was introduced to the system via the central feed tube, creating an electrically conductive cell in which water was oxidized at the anode and reduced at the cathode. A small 15-watt solar panel was used to provide renewable electricity to the system.

When a DC current from the solar panel was applied to the apparatus, hydrogen and hydroxide base were produced rapidly at the cathode while oxygen and acid formed at the anode. Hydrogen and oxygen gas flowed up the cathode and anode tubes, respectively, and were collected at the top. Acid and base accumulating in the anode and cathode tubes were collected via stopcock valves. Fresh electrolyte introduced to the central feed tube forced acid and base up the anode and cathode tubes, preventing them from recombining within the system. Within a few minutes of operation, the electrolyte in the anode cell had reached a pH of about 2, and in the cathode cell a pH of about 12, a differential of 10 pH units. Unlike the traditional chloralkali process for manufacturing hydroxide base, this renewable method of base production generated no chlorine or carbon dioxide. Sulfuric acid, a high demand commodity chemical was produced instead of chlorine.

Base produced in the cathode cell began to trap atmospheric carbon dioxide immediately, a process that was greatly enhanced by maximizing air-water exposure. This was achieved by bubbling air or gas through the basic solution or by spraying base through a column of air or carbon dioxide containing gas.

A passive trapping approach also demonstrated clear carbon dioxide capture from the air. A small amount (20 g) of crystalline NaOH was spread in a thin layer on a glass plate exposed to the air. Over the first few days the hygroscopic NaOH absorbed significant water vapor from the air, becoming a soggy mass of crystals. During the course of the next two weeks these crystals gradually dried and became opaque white in color, a visible change from the initial translucent NaOH crystals. The white crystals were a combination of sodium bicarbonate and sodium carbonate, formed from atmospheric carbon dioxide. Addition of an acid, vinegar, to these crystals resulted in vigorous bubbling as carbon dioxide was released back to the air.

Example 2

A second example used a 1-inch diameter glass tube sealed at the bottom with a porous glass frit. The frit allowed fluid and ion exchange between the inside and outside of the glass tube, creating an inner anode or cathode cell. Flat nickel or platinum electrodes were placed on opposite sides of the glass frit and attached to a 15 W DC photovoltaic panel. This apparatus created a water electrolysis device that produced concentrated base inside the tube and concentrated acid outside the tube.

Depending on mode of operation, a pH differential of over 11 was quickly generated in this system; an acid-base concentration gradient of over 20 billion fold. The electrolyte inside the tube reached a pH of about 13, while across the frit, less than ¼ inch away, the electrolyte pH reached about 1.6. Vigorous production of hydrogen and oxygen were also observed.

Example 3

A third example included a two-chamber flow-through apparatus constructed from machined plastic. A peristaltic pump was used to circulate electrolytic solution into the anode and cathode chambers, which were physically separated by a semi-permeable membrane or filter. Variable width plastic spacers were used to vary the gaps between the electrodes and the membrane. A nickel-copper alloy was initially used as electrode material. Hydrogen and oxygen were collected at valves at the top of the device, and acid and base were continually circulated past the electrodes until sufficient concentrations were reached. A variable output DC power source was used to generate voltages sufficient to electrolyze water.

pH differentials of over about 10 units were quickly achieved and maintained in this apparatus. The nickel-copper electrodes proved susceptible to corrosion at certain voltages. Corrosion-resistant nickel, platinum, or stainless steel electrodes will be more resistant to corrosion.

Overall, these experiments clearly demonstrate that water electrolysis can be used in an integrated strategy to produce renewable hydrogen and trap carbon dioxide from the air or gas streams. Given that renewable hydrogen produced by water electrolysis is already promoted as a critical clean alternative to fossil fuels, this combined renewable hydrogen/carbon dioxide capture technology represents a significant advance in reducing global carbon dioxide emissions.

EMBODIMENTS OF THE INVENTION

Embodiment 1 is an electrochemical apparatus to generate renewable hydrogen and sequester carbon dioxide from gas streams comprising:

a) a water electrolysis chamber, adapted to electrolyze water and to be electrically connected to an electrical energy source, comprising at least one cathode, at least one anode and an aqueous electrolyte solution, the chamber comprising a first region adapted to concentrate hydroxide ions produced at the cathode and a second region adapted to concentrate hydronium ions produced at the anode when direct current is applied to the chamber during use;

b) gas contact assembly operably connected to the first region of the chamber and adapted to receive hydroxide ions in solution from the chamber and to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution; and d) a separation chamber operably connected to the gas contact assembly and adapted to separate the bicarbonate or carbonate ions from the solution in the gas contact assembly.

Embodiment 2 is an electrochemical apparatus to generate renewable hydrogen and sequester carbon dioxide from gas streams comprising:

a) an electrolysis chamber, adapted to electrolyze water and to be electrically connected to a electrical energy source, comprising at least one cathode, at least one anode and an aqueous electrolyte, the chamber comprising a first region adapted to concentrate hydroxide ions produced at the cathode and a second region adapted to concentrate hydronium ions produced at the anode when direct current is applied to the chamber during use;

b) a gas contact assembly integral with the first region of the chamber and adapted to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution; and d) a separation chamber operably connected to the gas contact assembly and adapted to separate the bicarbonate or carbonate ions from the solution in the gas contact assembly.

Embodiment 3 is an electrochemical apparatus to generate renewable hydrogen and sequester carbon dioxide from gas streams comprising:

a) a water electrolysis chamber, adapted to electrolyze water and to be electrically connected to a renewable energy source, comprising at least one cathode, at least one anode and an aqueous electrolyte solution, the chamber comprising a first region adapted to concentrate hydroxide ions produced at the cathode and a second region adapted to concentrate hydronium ions produced at the anode when direct current at a predetermined voltage to electrolyze water is applied to the chamber during use;

b) a gas contact assembly operably connected to the first region of the chamber and adapted to receive hydroxide ions in solution from the chamber and to contain a gas stream containing carbon dioxide;

c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution;

d) a separation chamber operably connected to the gas contact assembly and adapted to separate the bicarbonate or carbonate ions from the solution in the gas contact assembly;

e) renewable hydrogen collecting equipment to collect hydrogen produced at the cathode during use;

f) optional oxygen collecting equipment to collect oxygen produced at the anode during use; and g) a fuel cell, electrically connected to the chamber and operably connected to the renewable hydrogen collecting equipment and the optional oxygen collecting equipment, adapted to generate direct current from the renewable hydrogen produced at the cathode.

The apparatus of embodiment 3 further comprising a precipitation chamber operably connected to the separation chamber and adapted to remove solid carbonate or bicarbonate salts from a liquid phase.

The apparatus of embodiment 3, wherein the second region containing collected hydronium ions is operably connected to the separation chamber and adapted to release carbon dioxide from the carbonate or bicarbonate ions from solution.

The apparatus of embodiment 3 further comprising carbon dioxide collecting equipment to collect concentrated carbon dioxide gas produced in the separation chamber.

The apparatus of embodiment 3, further comprising electrolyte supply equipment adapted to supply fresh electrolyte to the chamber in a batch-wise or continuous manner.

The apparatus of embodiment 3, further comprising electrolyte supply equipment adapted to supply fresh electrolyte to the chamber in a batch-wise or continuous manner, wherein the electrolyte supply equipment concentrates anions and cations in the electrolyte and delivers concentrated anions to the anode and cations to the cathode in the electrolysis chamber.

The apparatus of embodiment 3, wherein the first and second regions are separated by a passive barrier adapted to allow electrical current between the anode and cathode and to limit electrolyte solution mixing between the first and second regions.

The apparatus of embodiment 3, wherein the first and second regions are separated by an active barrier adapted to allow electrical current between the anode and cathode and to limit electrolyte solution mixing between the first and second regions.

The apparatus of embodiment 3, wherein the first and second regions are separated by at least one of an ion selective membrane, permeable barrier, or charged metal screen.

Embodiment 4 is an electrochemical apparatus to generate renewable hydrogen and sequester carbon dioxide from the atmosphere or a gas streams comprising:

a) an electrolysis chamber, adapted to electrolyze water and to be electrically connected to a electrical energy source, comprising at least one cathode, at least one anode and an aqueous electrolyte, the chamber comprising a first region adapted to concentrate hydroxide ions produced at the cathode and a second region adapted to concentrate hydronium ions produced at the anode when direct current is applied to the chamber during use;

b) base supply equipment operably connected to the first region of the chamber and adapted to receive aqueous hydroxide base from the chamber and provide the hydroxide base as a droplets; and c) gas contact assembly to contact the atmosphere or the gas stream containing carbon dioxide with the hydroxide base and react the carbon dioxide with the hydroxide base droplets to form a solution of bicarbonate or carbonate ions.

The apparatus of embodiment 4, wherein the gas contact assembly contacts the atmosphere or the gas stream containing carbon dioxide with hydroxide droplets formed as a spray or mist.

The apparatus of embodiment 4, wherein the gas contact assembly comprises one or more open chambers in contact with the atmosphere or the gas stream containing carbon dioxide.

The apparatus of embodiment 4, wherein the bicarbonate or carbonate solution is concentrated by wind drying, solar drying, temperature changes, pressure changes or a combination thereof.

The apparatus of embodiment 4, wherein multiple gas contact assemblies are arranged in series and configured so that gravity is used to supply lower chambers with enriched bicarbonate or carbonate solution.

The apparatus of embodiment 4, wherein hydroxide solution from region one is supplied by a continuous process or by a batch wise process.

The apparatus of embodiment 4, further comprising a separation chamber operably connected to the gas contact assembly and adapted to separate the bicarbonate or carbonate ions from the solution.

The apparatus of embodiment 4, further comprising a precipitation chamber operably connected to the separation chamber and adapted to remove solid carbonate or bicarbonate salts from the solution.

The apparatus according to any one of embodiments 1 through 4, further comprising a direct current assembly that provides a pulsed direct current.

The apparatus according to any one of embodiments 1 through 4, further comprising hydrogen collecting equipment to collect hydrogen produced at the cathode during use.

The apparatus according to any one of embodiments 1 through 4, further comprising optional oxygen collecting equipment to collect oxygen produced at the anode during use.

The apparatus according to any one of embodiments 1 through 4, further comprising a fuel cell, electrically connected to the chamber and operably connected to the renewable hydrogen collecting equipment and optional oxygen collecting equipment, adapted to generate direct current from the renewable hydrogen produced at the cathode and the optional oxygen produced at the anode.

The apparatus according to any one of embodiments 1 through 4, wherein the gas contact assembly is a batch reactor or a series of batch reactors, a gas/liquid absorption/reaction device or a series of gas/liquid absorption/reaction devices, or a bubble column or a series of bubble columns.

The apparatus according to any one of embodiments 1 through 4 further comprising a precipitation chamber operably connected to the separation chamber and adapted to remove solid carbonate or bicarbonate salts from a liquid phase during use.

The apparatus according to any one of embodiments 1 through 4, further comprising a cation exchange assembly adapted to precipitate carbonate or bicarbonate salts from solution as calcium or magnesium salts.

The apparatus according to any one of embodiments 1 through 4, further comprising an organic solvent assembly adapted to precipitate carbonate or bicarbonate salts from solution The apparatus according to any one of embodiments 1 through 4, further comprising a drying chamber operably connected to the separation chamber and adapted to remove solid carbonate or bicarbonate salts from a liquid phase during use.

The apparatus according to any one of embodiments 1 through 4, wherein the second region containing concentrated hydronium ions is operably connected to the separation chamber and adapted to separate the bicarbonate or carbonate ions from the solution as concentrated carbon dioxide gas or supercritical carbon dioxide.

The apparatus according to any one of embodiments 1 through 4, further comprising carbon dioxide collecting equipment to collect pressurized carbon dioxide gas produced in the separation chamber using the expansion of hydrogen and oxygen gases generated in the chamber.

The apparatus according to any one of embodiments 1 through 4, further comprising electrolyte supply equipment adapted to continuously supply fresh electrolyte solution to the chamber.

The apparatus according to any one of embodiments 1 through 4 further comprising electrolyte supply equipment adapted to continuously supply fresh electrolyte solution to the chamber, wherein the electrolyte supply equipment concentrates or directs anions and cations in the electrolyte solution and selectively delivers concentrated anions to the anode and cations to the cathode in the electrolysis chamber.

The apparatus according to any one of embodiments 1 through 4, wherein fresh electrolyte solution is introduced to the chamber in a predetermined flow configuration adapted to concentrate hydroxide ions at the cathode and hydronium ions at the anode.

The apparatus according to any one of embodiments 1 through 4, further comprising electrolyte supply equipment adapted to continuously supply fresh electrolyte solution to the chamber, wherein the electrolyte supply equipment comprises a central supply system to supply anode and cathode regions in the chamber with fresh electrolyte solution.

The apparatus according to any one of embodiments 1 through 4, further comprising electrolyte supply equipment adapted to supply fresh electrolyte solution to the chamber in a batch-wise manner.

The apparatus according to any one of embodiments 1 through 4, wherein the first and second regions are separated by a passive barrier adapted to allow electrical current and ion flow between the anode and cathode and to limit electrolyte solution mixing between the first and second regions.

The apparatus according to any one of embodiments 1 through 4, wherein the first and second regions are separated by an active barrier adapted to allow electrical current and selective ion flow between the anode and cathode and to limit electrolyte solution mixing between the first and second regions.

The apparatus according to any one of embodiments 1 through 4, wherein the first and second regions are separated by at least one membrane.

The apparatus according to any one of embodiments 1 through 4, wherein the first and second regions are separated by a gel.

The apparatus according to any one of embodiments 1 through 4, wherein the first and second regions are separated by one or more ion exchange resins.

The apparatus according to any one of embodiments 1 through 4, wherein the first and second regions are separated by ion-specific barriers.

The apparatus according to any one of embodiments 1 through 4, wherein the anode or cathodes comprise wire, sheet, screen or microsphere or nanosphere porous electrodes.

The apparatus according to any one of embodiments 1 through 4, wherein the anode or cathode comprises stacked electrodes made of fine mesh screens, thin plates or porous microsphere or nanosphere materials of the same or different voltages in a range of about 1.2 to 10 volts.

The apparatus according to any one of embodiments 1 through 4, wherein the electrical energy source is a renewable electrical energy source generated by wind, solar, hydroelectric, geothermal, wave, ocean current, tidal, or biofuel energy.

The apparatus according to any one of embodiments 1 through 4, wherein the electrical energy source is a nuclear generator.

The apparatus according to any one of embodiments 1 through 4, wherein the electrical energy source is a fuel cell.

The apparatus according to any one of embodiments 1 through 4, wherein the electrical energy source is alternating current converted to direct current.

Although the present invention has been described with reference to preferred embodiments, workers skilled in the art will recognize that changes may be made in form and detail without departing from the spirit and scope of the invention.

The invention claimed is:

1. An electrochemical apparatus to sequester carbon dioxide from gas streams and generate hydrogen comprising:
   a) an electrolysis chamber, electrically connected to an electrical energy source and comprising at least one cathode, at least one anode, and a substantially chloride-free aqueous electrolyte solution, the electrolysis chamber further comprising a first region adapted to concentrate hydroxide ions produced at the cathode and a second region adapted to concentrate hydronium ions produced at the anode when direct current is applied to the electrolysis chamber;
   b) a gas contact assembly operably connected to the first region of the electrolysis chamber and adapted to receive hydroxide ions in solution from the electrolysis chamber and to contain a gas stream containing carbon dioxide;
   c) gas supply equipment adapted to provide the gas stream containing carbon dioxide to the gas contact assembly to contact hydroxide ions in solution with the carbon dioxide and react the hydroxide ions with the carbon dioxide to form bicarbonate or carbonate ions in solution; and
   d) a separation chamber operably connected to the gas contact assembly and adapted to separate the bicarbonate or carbonate ions from the solution in the gas contact assembly;
   wherein, the electrolysis chamber is configured to produce less than about 100 milligrams of chlorine per liter of the electrolyte solution.

2. The apparatus of claim 1, further comprising a precipitation chamber operably connected to the separation chamber and adapted to remove solid carbonate or bicarbonate salts from a liquid phase during use.

3. The apparatus of claim 2 further comprising a double exchange assembly adapted to precipitate carbonate or bicarbonate salts from solution as calcium or magnesium salts through a double displacement reaction.

4. The apparatus of claim 2 further comprising an organic solvent assembly adapted to precipitate carbonate or bicarbonate salts from solution.

5. The apparatus of claim 1, wherein the second region containing concentrated hydronium ions is operably connected to the separation chamber and adapted to convert the bicarbonate or carbonate ions from the solution into concentrated carbon dioxide gas or supercritical carbon dioxide.

6. The apparatus of claim 5 further comprising carbon dioxide collecting equipment to collect pressurized carbon dioxide gas produced in the separation chamber using the expansion of hydrogen and oxygen gases generated in the electrolysis chamber.

7. The apparatus of claim 1 further comprising electrolyte supply equipment adapted to continuously supply substantially chloride-free fresh electrolyte solution to the electrolysis chamber.

8. The apparatus of claim 7 wherein the electrolyte supply equipment is adapted to concentrate or direct anions and cations in the electrolyte solution and to selectively deliver concentrated anions to the anode and cations to the cathode in the electrolysis chamber.

9. The apparatus of claim 7, wherein the electrolyte supply equipment is configured to introduce the fresh electrolyte solution to the electrolysis chamber in a predetermined flow configuration to produce concentrated hydroxide ions at the cathode and concentrated hydronium ions at the anode.

10. The apparatus of claim 7, wherein the electrolyte supply equipment comprises a central supply system configured to supply a first portion of the fresh electrolyte solution to the first region in a first direction and a second portion of the fresh electrolyte solution to the second region in a second direction.

11. The apparatus of claim 1, wherein the first and second regions are separated by an active barrier adapted to allow electrical current and selective ion flow between the anode and cathode and to limit electrolyte solution mixing between the first and second regions.

12. The apparatus of claim 1 wherein the anode or cathode comprise a porous microsphere or nanosphere electrode.

13. The apparatus of claim 1, wherein the electrical energy source is a renewable electrical energy source generated by wind, solar, hydroelectric, geothermal, wave, ocean current, tidal, or biofuel energy.

14. The apparatus of claim 1, wherein the electrical energy source is a nuclear generator.

15. A carbon dioxide negative electrochemical manufacturing apparatus to generate renewable hydrogen and sequester carbon dioxide from the air or gas streams comprising:
   a) a water electrolysis chamber, adapted to electrolyze water and to be electrically connected to a renewable energy source or other low-carbon energy source, comprising at least one cathode, at least one anode, and an aqueous alkali salt electrolyte solution that is substantially chloride-free, the electrolysis chamber further comprising a first region adapted to concentrate hydroxide ions produced at the cathode and a second region adapted to concentrate hydronium ions produced at the anode when direct current at a predetermined voltage to electrolyze water of the electrolyte solution is applied to the electrolysis chamber during use, wherein the electrolysis chamber is configured to produce up to about 40 kg of sodium hydroxide or a molar equivalent of potassium hydroxide for every kilogram of hydrogen produced and to produce up to about 49 kg of sulfuric acid for every kilogram of hydrogen produced;
   b) a gas contact assembly operably connected to the first region of the electrolysis chamber and adapted to receive hydroxide ions in solution from the electrolysis chamber and to contain a gas stream containing carbon dioxide;
   c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution;
   d) a separation chamber operably connected to the gas contact assembly and adapted to separate the bicarbonate or carbonate ions from the solution in the gas contact assembly;
   e) hydrogen collecting equipment to collect renewable hydrogen produced at the cathode during use; and
   f) optional oxygen collecting equipment to collect oxygen produced at the anode during use;
   wherein, the electrolysis chamber is configured to produce less than about 100 milligrams of chlorine per liter of the electrolyte solution.

16. The apparatus of claim 15, wherein the second region containing collected hydronium ions is operably connected to the separation chamber and adapted to release carbon dioxide from the carbonate or bicarbonate ions from solution.

17. The apparatus of claim 16 further comprising carbon dioxide collecting equipment to collect concentrated carbon dioxide gas produced in the separation chamber.

18. The apparatus of claim 15, further comprising electrolyte supply equipment configured to concentrate anions and cations in the electrolyte solution and deliver concentrated anions to the anode and cations to the cathode in the electrolysis chamber.

19. The apparatus of claim 15, wherein the first and second regions are separated by a passive barrier adapted to allow electrical current between the anode and cathode and to limit electrolyte solution mixing between the first and second regions, wherein the passive barrier is adapted to pass cations and anions from the alkali salt in the electrolyte solution.

20. An electrochemical apparatus to generate renewable hydrogen and sequester carbon dioxide from gas streams comprising:
   a) an electrolysis chamber, adapted to electrolyze water and to be electrically connected to a electrical energy source, comprising at least one cathode, at least one anode, and an aqueous electrolyte, the electrolysis chamber further comprising a first region adapted to concentrate hydroxide ions produced at the cathode from an initial concentration of hydroxide ions to a concentration of hydroxide ions that is between about 100 and about 10,000,000 times higher than the initial concentration of hydroxide ions when direct current is applied to the electrolysis chamber, and a second region adapted to concentrate hydronium ions produced at the anode from an initial concentration of hydronium ions to a concentration of hydronium ions that is between about 100 and about 10,000,000 times higher than the initial concentration of hydronium ions when direct current is applied to the electrolysis chamber;
   b) a gas contact assembly integral with the first region of the electrolysis chamber and adapted to contain a gas stream containing carbon dioxide;
   c) gas supply equipment adapted to provide the gas stream containing carbon dioxide to the gas contact assembly to contact carbon dioxide with the hydroxide ions in solution and react the carbon dioxide with the hydroxide ions to form bicarbonate or carbonate ions in solution; and
   d) a separation chamber operably connected to the gas contact assembly and adapted to separate the bicarbonate or carbonate ions from the solution in the gas contact assembly;
   wherein, the electrolysis chamber is configured to produce less than about 100 milligrams of chlorine per liter of the electrolyte solution.

21. A carbon-negative electrochemical apparatus to generate renewable hydrogen and sequester carbon dioxide from the atmosphere or a gas streams comprising:
   a) an electrolysis chamber, adapted to electrolyze water and to be electrically connected to a renewable electrical energy source, comprising at least one cathode, at least one anode, and an aqueous electrolyte, the electrolysis chamber comprising a first region adapted to concentrate hydroxide ions produced at the cathode and a second region adapted to concentrate hydronium ions produced at the anode when direct current is applied to the electrolysis chamber;
   b) base supply equipment operably connected to the first region of the electrolysis chamber and adapted to receive aqueous hydroxide base from the electrolysis chamber;
   c) a gas contact assembly to contact the atmosphere or the gas stream containing carbon dioxide with the hydroxide base and react the carbon dioxide with the hydroxide base to form a solution of bicarbonate or carbonate ions; and
   d) a value-added product assembly configured to receive the solution of bicarbonate or carbonate ions from the gas contact assembly and to produce a secondary value-added product from the solution of bicarbonate or carbonate ions;
   wherein, the electrolysis chamber is configured to produce less than about 100 milligrams of chlorine per liter of the electrolyte solution.

22. The apparatus of claim 21, wherein the gas contact assembly comprises an open-air treatment reservoir.

23. The apparatus of claim 21 wherein multiple gas contact assemblies are arranged in series and configured so that gravity is used to supply lower chambers with enriched bicarbonate or carbonate solution.

24. The apparatus of claim 21 further comprising a separation chamber operably connected to the gas contact assembly and adapted to separate the bicarbonate or carbonate ions from the solution.

25. The apparatus of claim 21 further comprising a precipitation chamber operably connected to the separation chamber and adapted to remove solid carbonate or bicarbonate salts from the solution.

26. The apparatus of claim 1, wherein the electrolysis chamber is configured to produce less than about 1 milligram of chlorine per liter of the substantially chloride-free aqueous electrolyte solution.

27. The apparatus of claim 1, wherein the electrolysis chamber is configured to produce less than about 10 milligrams of chlorine per liter of the electrolyte solution.

28. The apparatus of claim 1, wherein the substantially chloride-free aqueous solution comprises potassium sulfate.

29. The apparatus of claim 1, wherein the substantially chloride-free aqueous solution comprises a solution of sodium sulfate at about 30 degrees Celsius and ranging in concentration from about 1M to saturation.

30. The apparatus of claim 1, wherein the electrolysis chamber further comprises at least two electrolyte preparation electrodes configured to presort ions in the electrolyte solution prior to its introduction into the electrolysis chamber.

31. The apparatus of claim 30, wherein the at least two electrolyte preparation electrodes are configured to presort ions by applying voltage of less than about 1.2 volts.

32. The apparatus of claim 11, wherein the active barrier is adapted to use fluid dynamics to limit electrolyte solution mixing between the first region and the second region of the electrolysis chamber.

33. The apparatus of claim 32, wherein the active barrier includes an elongated first portion that branches bi-directionally to create a first section adapted to direct a first portion of the electrolyte solution in a first direction and to create a second section adapted to direct a second portion of the electrolyte solution in a second direction.

34. The apparatus of claim 33, wherein the first section and the second section of the active barrier comprise a constructed pathway configured to limit electrolyte solution mixing between the first region and the second region of the electrolysis chamber.

35. The apparatus of claim 15, wherein the electrolysis chamber is configured to produce less than about 10 mg of chlorine for every liter of the aqueous alkali salt electrolyte solution.

36. The apparatus of claim 21, wherein the gas contact assembly is configured to nebulize the hydroxide base and to actively inject the hydroxide base into the gas stream.

37. The apparatus of claim 21, wherein the secondary value-added product is a building material.

38. The apparatus of claim 21, wherein the secondary value-added product is agricultural lime, quick lime, or magnesium carbonate.

39. The apparatus of claim 21, wherein the value-added product assembly is configured to incorporate bicarbonate ions from the solution of bicarbonate or carbonate ions into a plastic as a filler.

40. The apparatus of claim 21, wherein the value-added product assembly is configured to incorporate the carbonate ions from the solution of bicarbonate or carbonate ions into a plastic as a filler.

41. The apparatus of claim 1, wherein the substantially chloride-free aqueous solution comprises magnesium sulfate.

42. The apparatus of claim 1, wherein the substantially chloride-free aqueous solution comprises sodium nitrate.

43. The apparatus of claim 1, wherein the substantially chloride-free aqueous solution comprises potassium nitrate.

44. The apparatus of claim 1, wherein the substantially chloride-free aqueous solution comprises sodium or potassium bicarbonate.

45. The apparatus of claim 1, wherein the substantially chloride-free aqueous solution comprises sodium or potassium carbonate.

46. The apparatus of claim 1, wherein the substantially chloride-free aqueous solution comprises sodium or potassium sulfate.

47. The apparatus of claim 1, wherein the electrolysis chamber comprises at least three cells, wherein the first cell of the at least three cells comprises the first region, wherein the second cell of the at least three cells comprises the second region, wherein the first cell is configured to move hydroxide ions in a first direction, and wherein the second cell is configured to move hydronium ions in the first direction.

48. The apparatus of claim 47, wherein the third cell of the at least three cells is configured to receive the electrolyte solution and to move the electrolyte solution in a second direction.

49. The apparatus of claim 48, wherein the first and third cells are separated by a first semi-permeable membrane, and wherein the second and third cells are separated by a second semi-permeable membrane.

50. The apparatus of claim 15, further comprising a fuel cell electrically connected to the electrolysis chamber and operably connected to the hydrogen collecting equipment and the optional oxygen collecting equipment, wherein the fuel cell is adapted to generate direct current from some or all of the hydrogen produced at the cathode and optionally some or all of the oxygen produced at the anode.

51. An electrochemical apparatus to sequester carbon dioxide from gas streams and generate hydrogen comprising:
 a) an electrolysis chamber electrically connected to an electrical energy source and comprising at least one cathode, at least one anode, and an aqueous electrolyte solution, the electrolysis chamber further comprising a first region adapted to concentrate hydroxide ions produced at the cathode and a second region adapted to concentrate hydronium ions produced at the anode when direct current is applied to the electrolysis chamber, and wherein the electrolysis chamber is configured to produce substantially no chlorine gas when direct current is applied to the electrolysis chamber;
 b) a gas contact assembly operably connected to the first region of the electrolysis chamber and adapted to receive hydroxide ions in solution from the electrolysis chamber and to contain a gas stream containing carbon dioxide;
 c) gas supply equipment adapted to provide the gas stream containing carbon dioxide to the gas contact assembly to contact hydroxide ions in solution with the carbon dioxide and react the hydroxide ions with the carbon dioxide to form bicarbonate or carbonate ions in solution; and
 d) a separation chamber operably connected to the gas contact assembly and adapted to separate the bicarbonate or carbonate ions from the solution in the gas contact assembly;
 wherein, the electrolysis chamber is configured to produce less than about 100 milligrams of chlorine per liter of the electrolyte solution.

52. The apparatus of claim 51, wherein the electrolysis chamber is configured to produce less than about 1 milligram of chlorine per liter of the aqueous electrolyte solution.

53. The apparatus of claim 51, wherein the electrolysis chamber is configured to produce less than about 10 milligrams of chlorine per liter of the aqueous electrolyte solution.

54. The apparatus of claim 51, wherein the aqueous electrolyte solution comprises an alkali salt.

55. The apparatus of claim 51, further comprising a central supply system configured to supply aqueous electrolyte solution to the first region in a first direction and aqueous electrolyte solution to the second region in a second direction.

56. The apparatus of claim 51, wherein the electrolysis chamber comprises at least three cells, wherein the first cell of the at least three cells comprises the first region, wherein the second cell of the at least three cells comprises the second region, wherein the first cell is configured to move hydroxide ions in a first direction, and wherein the second cell is configured to move hydronium ions in the first direction.

57. The apparatus of claim 56, wherein the third cell of the at least three cells is configured to receive aqueous electrolyte solution and to move the aqueous electrolyte solution in a second direction.

58. The apparatus of claim 1, wherein the electrolyte solution comprises a non-chloride alkali salt dissolved in distilled water.

59. The apparatus of claim 1, wherein the electrolyte solution comprises sodium sulfate dissolved in distilled water.

60. The apparatus of claim 1, wherein the electrolysis chamber is configured to simultaneously:
 in the first region concentrate the hydroxide ions produced at the cathode from an initial concentration of hydroxide ions to a concentration of hydroxide ions that is between about 100 and about 10,000,000 times higher than the initial concentration of hydroxide ions;
 in the second region concentrate the hydronium ions produced at the anode from an initial concentration of hydronium ions to a concentration of hydronium ions that is between about 100 and about 10,000,000 times higher than the initial concentration of hydronium ions; and
 produce less than about 10 milligrams of chlorine per liter of the electrolyte solution.

61. The apparatus of claim 1, wherein the electrolysis chamber is configured to simultaneously:
 in the first region concentrate the hydroxide ions produced at the cathode from an initial concentration of hydroxide ions to a concentration of hydroxide ions that is between about 100 and about 10,000,000 times higher than the initial concentration of hydroxide ions;
 in the second region concentrate the hydronium ions produced at the anode from an initial concentration of hydronium ions to a concentration of hydronium ions that is between about 100 and about 10,000,000 times higher than the initial concentration of hydronium ions; and
 produce less than about 1 milligram of chlorine per liter of the electrolyte solution.

62. The apparatus of claim 1, wherein the electrolysis chamber is configured to simultaneously:

in the first region concentrate the hydroxide ions to a concentration of 100,000 times or higher than an initial concentration in the electrolyte solution;
in the second region concentrate the hydronium ions to a concentration of 100,000 times or higher than an initial concentration in the electrolyte solution; and
produce less than about 10 milligrams of chlorine per liter of the electrolyte solution.

63. The apparatus of claim 1, wherein the electrolysis chamber is configured to simultaneously:

in the first region concentrate the hydroxide ions to a concentration of 100,000 times or higher than an initial concentration in the electrolyte solution;
in the second region concentrate the hydronium ions to a concentration of 100,000 times or higher than an initial concentration in the electrolyte solution; and
produce less than about 1 milligram of chlorine per liter of the electrolyte solution.

* * * * *